(12) United States Patent
Ryu et al.

(10) Patent No.: US 9,854,585 B2
(45) Date of Patent: Dec. 26, 2017

(54) DYNAMIC MEDIUM ACCESS CONTROL SWITCHING

(71) Applicant: QUALCOMM Incorporated, San Diego, CA (US)

(72) Inventors: Jung Ho Ryu, Jersey City, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/952,005

(22) Filed: Nov. 25, 2015

(65) Prior Publication Data
US 2016/0323888 A1 Nov. 3, 2016

Related U.S. Application Data

(60) Provisional application No. 62/154,871, filed on Apr. 30, 2015.

(51) Int. Cl.
*H04W 74/00* (2009.01)
*H04B 1/10* (2006.01)
*H04W 72/04* (2009.01)
*H04L 1/00* (2006.01)
*H04L 5/00* (2006.01)
*H04L 5/14* (2006.01)

(52) U.S. Cl.
CPC .......... *H04W 72/0486* (2013.01); *H04B 1/10* (2013.01); *H04L 1/0001* (2013.01); *H04W 72/046* (2013.01); *H04W 72/0413* (2013.01); *H04W 74/006* (2013.01); *H04L 5/001* (2013.01); *H04L 5/0023* (2013.01); *H04L 5/0048* (2013.01); *H04L 5/14* (2013.01)

(58) Field of Classification Search
CPC ........... H04W 72/0413; H04W 72/046; H04W 72/0486; H04W 28/18; H04W 74/00; H04B 1/10; H04L 27/26; H04L 5/00
USPC ....................................... 455/452.1
See application file for complete search history.

(56) References Cited

U.S. PATENT DOCUMENTS

| 7,660,326 B2 | 2/2010 | Shachar et al. |
| 8,472,497 B2 | 6/2013 | Lakkis |
| 8,660,600 B2 | 2/2014 | Khandekar et al. |

(Continued)

OTHER PUBLICATIONS

ISA/EPO, International Search Report and Written Opinion of the International Searching Authority, Int'l Appl. No. PCT/US2016/022949, dated Jun. 20, 2016, European Patent Office, Rijswijk, NL, 10 pgs.

*Primary Examiner* — Nathan Taylor
(74) *Attorney, Agent, or Firm* — Holland & Hart LLP

(57) ABSTRACT

Methods, systems, and devices are describe for dynamic medium access control (MAC) algorithm selection in a wireless communication system. A device, e.g., a user equipment or base station, may identify a channel parameter associated with a first channel used for communications in the wireless communication system. The device may dynamically select, based at least in part on the channel parameter, a first MAC algorithm from a plurality of MAC algorithms available for communications using the first channel. The wireless communication system may be a millimeter wave wireless communication system and may, in some examples, use directional or beamformed transmissions.

30 Claims, 12 Drawing Sheets

(56) References Cited

U.S. PATENT DOCUMENTS

| | | | | |
|---|---|---|---|---|
| 8,743,708 | B1* | 6/2014 | Robertson | H04W 28/18 |
| | | | | 370/252 |
| 2006/0045117 | A1* | 3/2006 | Qi | H04W 24/02 |
| | | | | 370/445 |
| 2006/0233178 | A1* | 10/2006 | Lu | H04L 1/0001 |
| | | | | 370/395.21 |
| 2008/0240058 | A1* | 10/2008 | Hansen | H04W 92/18 |
| | | | | 370/338 |
| 2009/0279512 | A1* | 11/2009 | Fujishima | H04B 7/0617 |
| | | | | 370/336 |
| 2010/0034152 | A1* | 2/2010 | Imamura | H04L 5/0007 |
| | | | | 370/329 |
| 2010/0099449 | A1* | 4/2010 | Borran | H04W 52/243 |
| | | | | 455/501 |
| 2010/0165856 | A1* | 7/2010 | Melpignano | H04W 28/22 |
| | | | | 370/252 |
| 2012/0201187 | A1* | 8/2012 | Koo | H04L 1/0027 |
| | | | | 370/312 |
| 2013/0308717 | A1* | 11/2013 | Maltsev | H04B 7/0417 |
| | | | | 375/267 |
| 2014/0098912 | A1 | 4/2014 | Yin et al. | |
| 2015/0312831 | A1* | 10/2015 | Sang | H04W 36/0083 |
| | | | | 370/236 |

* cited by examiner

DYNAMIC MEDIUM ACCESS CONTROL SWITCHING

CROSS REFERENCES

The present Application for Patent claims priority to U.S. Provisional Patent Application No. 62/154,871 by Ryu et al., entitled "Dynamic Medium Access Control Switching," filed Apr. 30, 2015, assigned to the assignee hereof, and expressly incorporated by reference herein.

BACKGROUND

Field of the Disclosure

The present disclosure, for example, relates to wireless communication systems, and more particularly to dynamically selecting medium access control schemes for a wireless communication systems.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). In some examples, one or more of the base stations may communicate with UEs using directional transmissions, e.g., beamforming techniques.

Medium access control (MAC) techniques permit access to one or more channels or time frequency resources of a wireless communication system. For example, MAC algorithms may help control and reduce interference by providing for which the UE can access (e.g., transmit/receive) on a particular channel (or group of channels) and during which time interval. Typically, a MAC algorithm is predetermined and fixed within a given wireless communication system, where different wireless communication systems may utilize different MAC techniques, e.g., ranging from no MAC techniques to complicated MAC coordination. Each MAC algorithm may be associated with certain advantages, e.g., over-head, latency, robustness, etc. Existing wireless communication systems that use fixed MAC techniques, however, do not permit flexibility in MAC algorithm selection and therefore fail to capture beneficial aspects of one MAC algorithm for a given situation as compared to beneficial aspects of a second MAC algorithm in a different situation.

SUMMARY

The described features generally relate to one or more improved methods, systems, devices, or apparatuses that enable dynamic selection of a medium access control (MAC) algorithm. Generally, the improved methods provide for a UE and/or a base station to select a MAC algorithm based on a channel parameter. For example, the UE may determine that communications from a neighbor base station are interfering with communications with the UE's serving base station. In some examples, the UE may identify the channel parameter and may select a MAC algorithm from several MAC algorithms available for communications. In some examples, the UE may report the interference/channel parameter information to its serving base station where the serving base station selects aspects of a MAC algorithm. For example, the serving base station may select a MAC algorithm and inform the UE, the neighbor base station, etc., of the selected MAC algorithm. In some examples, the serving base station may coordinate the selection of the MAC algorithm with the neighbor base station, e.g., based on the load requirements of the neighbor base station. In some examples, the wireless communication system may be a millimeter-wave (mmW) wireless communication system.

In a first set of illustrative examples, a method for wireless communication is provided. The method may include: identifying a channel parameter associated with a first channel used for communications in a wireless communication system; and dynamically selecting, based at least in part on the channel parameter, a first medium access control algorithm from a plurality of medium access control algorithms available for communications using the first channel.

In some aspects, the method may include dynamically selecting a second medium access control algorithm from the plurality of medium access control algorithms for communications using a second channel of the wireless communication system. The wireless communication system may be a millimeter-wave wireless communication system and the first channel may be associated with a first beam direction and the second channel may be associated with a second beam direction, the second beam direction being different from the first beam direction. Identifying the channel parameter may include: receiving, at a UE, a first pilot signal from a serving base station and a second pilot signal from at least one neighbor base station, the service base station and the at least one neighbor base station associated with the wireless communication system; and identifying the channel parameter based at least in part on the received first pilot signal and the received second pilot signal.

In some aspects, the received first pilot signal and the received second pilot signal may include a load indicator, wherein the channel parameter is determined based at least in part on the load indicator. The method may include determining that the second pilot signal from the at least one neighbor base station interferes with the first pilot signal from the serving base station, wherein the channel parameter is based at least in part on the interference. The method may include: receiving, at the serving base station, a message from the UE, the message comprising an indication of the channel parameter; dynamically selecting, by the serving base station, the medium access control algorithm based at least in part on the channel parameter indicated in the message; and informing the at least one neighbor base station of the selected medium access control algorithm to be used for communications using the wireless communication system.

In some aspects, the method may include: receiving, at the serving base station, a message from the UE, the message comprising an indication of the channel parameter; and coordinating with the at least one neighbor base station to dynamically select the medium access control algorithm based at least in part on the channel parameter. Coordinating with the at least one neighbor base station may include: receiving, at the serving base station, a message from the at least one neighbor base station conveying a load indicator;

dynamically selecting, by the serving base station, the medium access control algorithm based at least in part on the channel parameter and the load indicator; and informing the at least one neighbor base station of the selected medium access control algorithm to be used for communications using the wireless communication system.

In some aspects, the method may include: determining, by the UE, that the channel parameter has exceeded a predefined threshold level; dynamically selecting, by the UE, the medium access control algorithm based at least in part on the channel parameter exceeding the predefined threshold level; and sending a message to the serving base station conveying an indication of the selected medium access control algorithm. The first pilot signal from the serving base station and the second pilot signal from the at least one neighbor base station may be directional pilot signals. The method may include: identifying a first identification parameter associated with the first directional pilot signal from the serving base station and a second identification parameter associated with the second directional pilot signal from the at least one neighbor base station, wherein the channel parameter is associated with the identification parameters.

In some aspects, the plurality of available medium access control algorithms may include an un-coordinated medium access control algorithm, a request-to-send/clear-to-send (RTS/CTS) medium access control algorithm, and a coordinated medium access control algorithm.

In a second set of illustrative examples, an apparatus for wireless communication is provided. The apparatus may include: a processor; memory in electronic communication with the processor; and instructions stored in the memory. The instructions being executable by the processor to: identify a channel parameter associated with a first channel used for communications in a wireless communication system; and dynamically select, based at least in part on the channel parameter, a first medium access control algorithm from a plurality of medium access control algorithms available for communications using the first channel.

In some aspects, the apparatus may include instructions executable by the processor to dynamically select a second medium access control algorithm from the plurality of medium access control algorithms for communications using a second channel of the wireless communication system. The wireless communication system may be a millimeter-wave wireless communication system and the first channel may be associated with a first beam direction and the second channel may be associated with a second beam direction, the second beam direction being different from the first beam direction.

In some aspects, the instructions to identify the channel parameter are further executable by the processor to: receive, at a UE, a first pilot signal from a serving base station and a second pilot signal from at least one neighbor base station, the service base station and the at least one neighbor base station associated with the wireless communication system; and identify the channel parameter based at least in part on the received first pilot signal and the received second pilot signal. The received first pilot signal and the received second pilot signal may include a load indicator, wherein the channel parameter is determined based at least in part on the load indicator.

In some aspects, the apparatus may include instructions executable by the processor to determine that the second pilot signal from the at least one neighbor base station interferes with the first pilot signal from the serving base station, wherein the channel parameter is based at least in part on the interference. The apparatus may include instructions executable by the processor to: receive, at the serving base station, a message from the UE, the message comprising an indication of the channel parameter; dynamically select, by the serving base station, the medium access control algorithm based at least in part on the channel parameter indicated in the message; and inform the at least one neighbor base station of the selected medium access control algorithm to be used for communications using the wireless communication system.

In some aspects, the apparatus may include instructions executable by the processor to: receive, at the serving base station, a message from the UE, the message comprising an indication of the channel parameter; and coordinate with the at least one neighbor base station to dynamically select the medium access control algorithm based at least in part on the channel parameter. The instructions to coordinate with the at least one neighbor base station are further executable by the processor to: receive, at the serving base station, a message from the at least one neighbor base station conveying a load indicator; dynamically select, by the serving base station, the medium access control algorithm based at least in part on the channel parameter and the load indicator; and inform the at least one neighbor base station of the selected medium access control algorithm to be used for communications using the wireless communication system.

In some aspects, the apparatus may include instructions executable by the processor to: determine, by the UE, that the channel parameter has exceeded a predefined threshold level; dynamically select, by the UE, the medium access control algorithm based at least in part on the channel parameter exceeding the predefined threshold level; and send a message to the serving base station conveying an indication of the selected medium access control algorithm. The first pilot signal from the serving base station and the second pilot signal from the at least one neighbor base station are directional pilot signals.

In some aspects, the apparatus may include instructions executable by the processor to: identify a first identification parameter associated with the first directional pilot signal from the serving base station and a second identification parameter associated with the second directional pilot signal from the at least one neighbor base station, wherein the channel parameter is associated with the identification parameters. The plurality of available medium access control algorithms may include an un-coordinated medium access control algorithm, a request-to-send/clear-to-send (RTS/CTS) medium access control algorithm, and a coordinated medium access control algorithm.

In a third set of illustrative examples, an apparatus for wireless communication is provided. The apparatus may include: means for identifying a channel parameter associated with a first channel used for communications in a wireless communication system; and means for dynamically selecting, based at least in part on the channel parameter, a first medium access control algorithm from a plurality of medium access control algorithms available for communications using the first channel.

In some aspects, the apparatus may include means for dynamically selecting a second medium access control algorithm from the plurality of medium access control algorithms for communications using a second channel of the wireless communication system. The wireless communication system may be a millimeter-wave wireless communication system and the first channel may be associated with a first beam direction and the second channel may be associated with a second beam direction, the second beam direction being different from the first beam direction.

In a fourth set of illustrative examples, a non-transitory computer-readable medium storing computer-executable code for wireless communication is provided. The code executable by a processor to: identify a channel parameter associated with a first channel used for communications in a wireless communication system; and dynamically select, based at least in part on the channel parameter, a first medium access control algorithm from a plurality of medium access control algorithms available for communications using the first channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
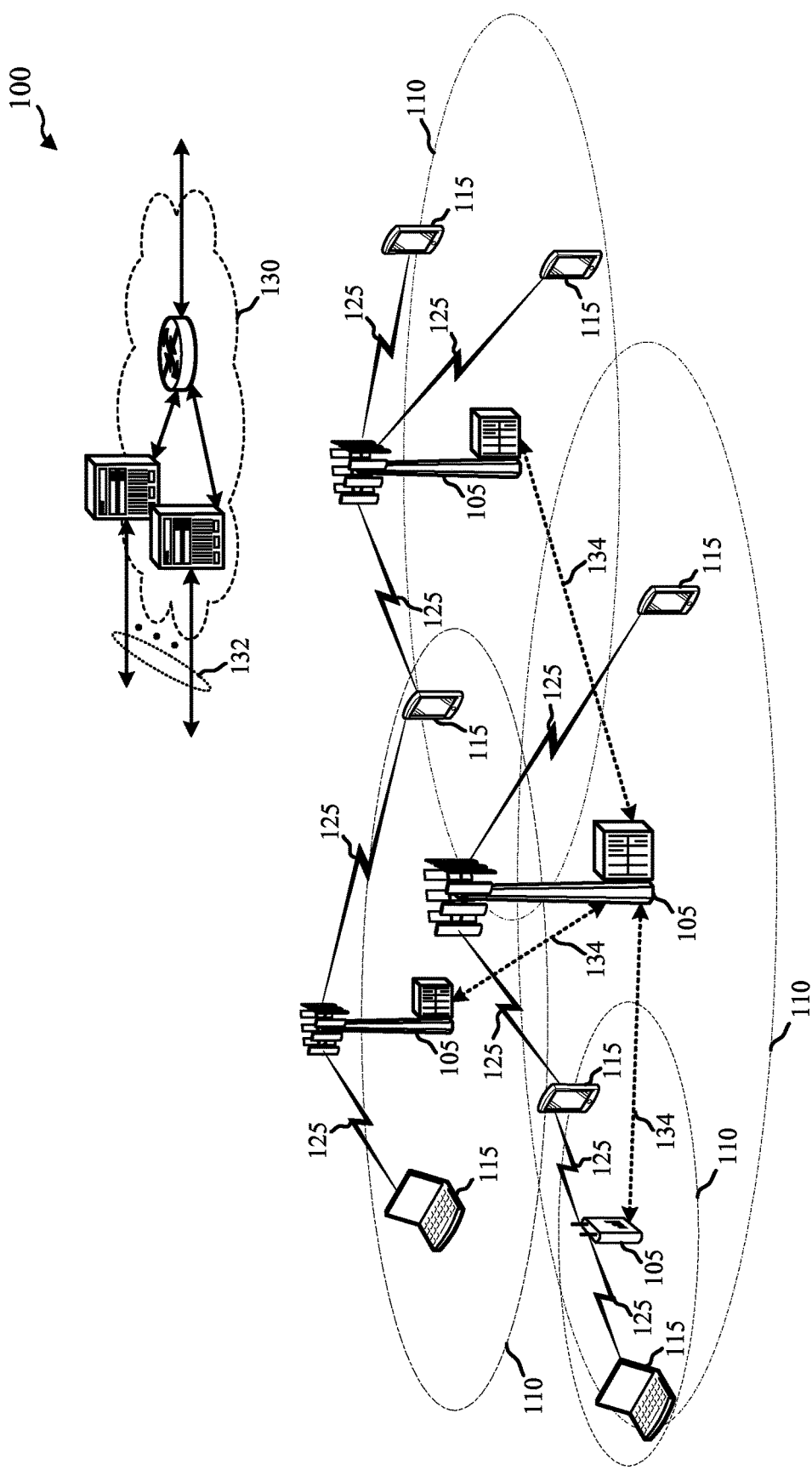
FIG. 1 shows a block diagram of a wireless communication system, in accordance with various aspects of the present disclosure.

Access techniques generally provide a mechanism for a device to access and communicate on a medium (e.g., frequency, channel, time slot, etc.) of a wireless communication system. Typically, such medium access control (MAC) algorithms are fixed for the wireless communication system, e.g., predetermined and do not change once selected. Some wireless communication systems employ an un-coordinated control technique where the device attempts to access the medium by transmitting at any time. While this un-coordinated control technique may benefit from no overhead and low latency (assuming a successful access), it may also be associated with reliability issues as there may be no guarantee that the access attempt will be successful. Other wireless communication systems employ a request-to-send/clear-to-send (RTS/CTS) technique where the device must ask for the channel before transmitting. While such an RTS/CTS technique may benefit from improved reliability and reduced interference, it may also be associated with higher overhead. Other wireless communication systems may employ a fully coordinated access control technique where the devices, e.g., base stations, UEs, etc., coordinate most or all aspects of medium access. These MAC techniques may benefit from reduced or no collisions, but may also be associated with high overhead and latency concerns. It may be beneficial for a wireless communication system to be able to dynamically select a MAC algorithm that leverages the benefits of the selected MAC algorithm for a particular situation.

According to certain aspects of the present disclosure, one or more devices of a wireless communication system may select between different MAC algorithms depending upon identified channel conditions. For example, a non-access control algorithm may initially be employed where the devices attempt to access the medium by transmitting when needed. A device, e.g., a UE, may determine that neighbor base station communications are causing interference by monitoring pilot signals being transmitted from the neighbor base station and being transmitted from its serving base station. The UE may determine that a different MAC algorithm may reduce or eliminate the interference and therefore select a different MAC algorithm for communications. In some examples, the UE may report the channel conditions to the serving base station which may determine that a different MAC algorithm may be used to reduce or eliminate the interference. The serving base station may, in some examples, coordinate with the neighbor base station to determine certain aspects of selecting a new MAC algorithm. The wireless communication system may be a mmW communication system and the pilot signals may be directional pilot signals.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter wave band (or mmW), since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support dynamic MAC algorithm selection techniques. For example, a UE 115 may monitor and measure interference and/or signal quality by monitoring pilot signals, beacons, synchronization signals, and the like, from base stations 105. The UE 115 may identify a channel parameter based on the measured interference. The channel parameter may be associated with at least one channel (or frequency) of the wireless communications system 100. In some examples, the UE 115 may dynamically select a MAC algorithm based on the channel parameter. The MAC algorithm may be selected from multiple MAC algorithms available for communications using the channel (or channels). The selected MAC algorithm may include switching from a un-coordinated MAC algorithm to a RTS/CTS MAC algorithm, to a fully coordinated MAC algorithm, or vice versa. The UE 115 may send a signal (or message) to its serving base station 105 to indicate the selected MAC algorithm that is to be used for communications on the channel. The selected MAC algorithm may reduce or eliminate the interference measured by the UE 115.

In other examples of the wireless communications system 100, the UE 115 may report the measured interference and/or signal quality to its serving base station 105. The serving base station 105 may identify the channel parameter for the channel based on the reported interference measurement. The serving base station 105 may dynamically select a MAC algorithm that may reduce or eliminate the interference measured by the UE 115. The serving base station 105 may, in some examples, coordinate with the neighbor base station 105 (e.g., the base station 105 causing the interference) to select the MAC algorithm.

Figure 2:
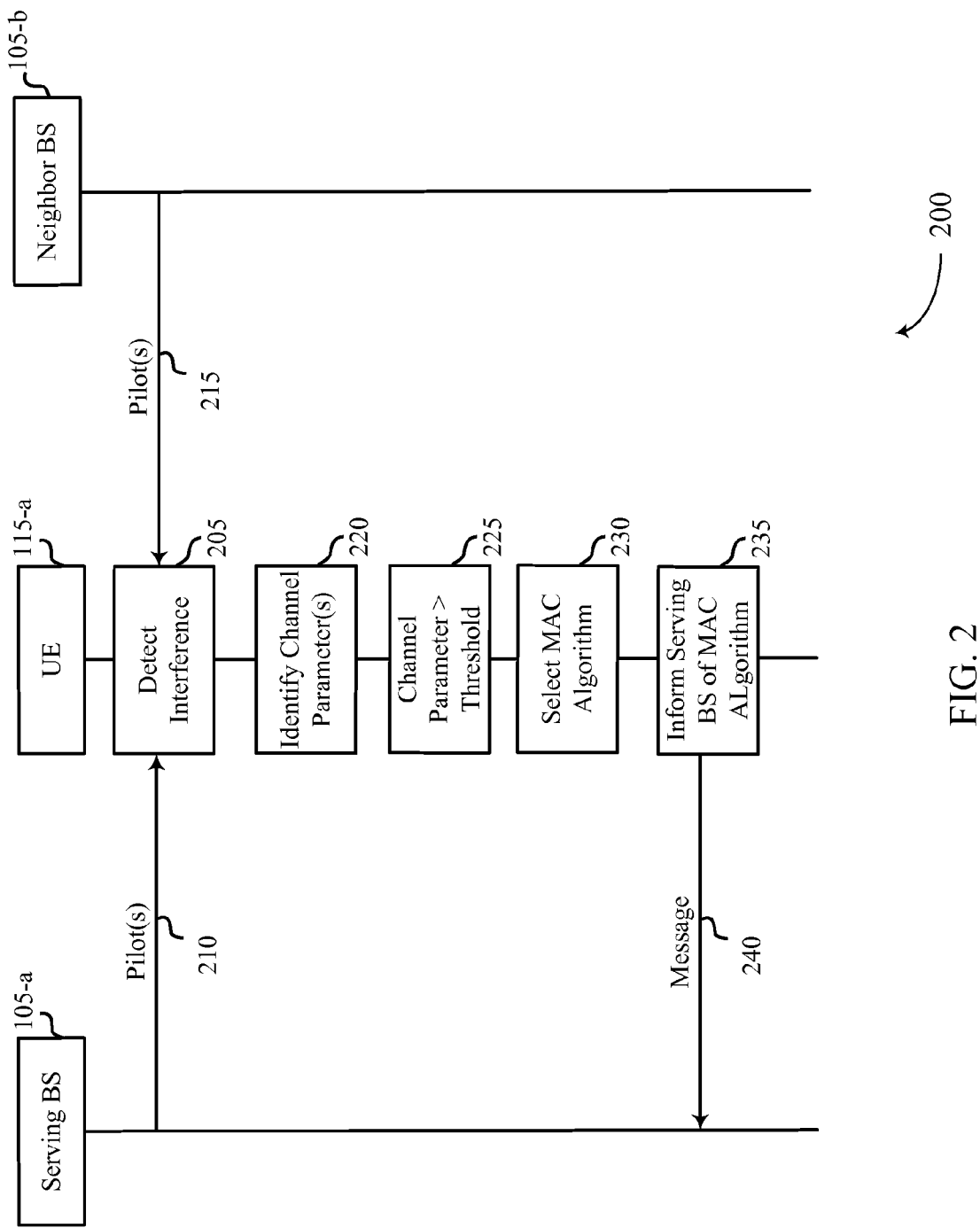
FIG. 2 shows a diagram of aspects of medium access control algorithm selection for use in a wireless communication, in accordance with various aspects of the present disclosure.

FIG. 2 is a diagram 200 illustrating aspects of dynamic MAC algorithm selection, in accordance with various aspects of the present disclosure. The diagram 200 may illustrate aspects of the system 100 described with reference to FIG. 1. The diagram 200 includes a serving base station 105-a, a UE 115-a, and a neighbor base station 105-b. The serving base station 105-a and/or the neighbor base station 105-b may be examples of one or more of the base stations 105 described above with respect to FIG. 1. The UE 115-a may be an example of one or more of the UEs 115 described with respect to FIG. 1. In some examples, the serving base station 105-a and/or the neighbor base station 105-b may be mmW base stations. In some examples, a system device, such as one of the base stations 105 and/or UEs 115 may execute one or more sets of codes to control the functional elements of the device to perform some or all of the functions described below.

At 205, the UE 115-a may detect interference associated with pilot signal 210 from serving base station 105-a and pilot signal 215 from neighbor base station 105-b. Based on the pilot signals, for example, UE 115-a may determine that communications from neighbor base station 105-b may interfere with communications with serving base station 105-a. In some examples, serving base station 105-a and neighbor base station 105-b may be mmW base stations and pilot signals 210 and 215 may be directional pilot signals. Base stations 105 may transmit the pilot signals using beamforming techniques such that a certain number of pilot signals may be transmitted, where each pilot signal may be transmitted in a different direction. Accordingly, the pilot signals may also include identification information, e.g., a pilot identity and/or information associated with the beamforming direction. In some examples, the pilot signals may also include load information. The load information may be for each beamforming direction and convey an indication of the load or amount of traffic that is to be, or is being communicated in the beamforming direction. As one example, pilot signal 210 may include an identifier of "B2" and a load indicator that indicates heavy traffic is being communicated whereas pilot signal 215 may include an identifier "B5" and a load indicator that indicates heavy traffic is being communicated. Accordingly, UE 115-a may determine that pilot signal B5 from neighbor base station 105-b may interfere with pilot signal B2 from serving base station 105-a.

At 220, the UE 115-a may identify the channel parameters based on the detected interference. For example, the channel parameters may include information indicating that pilot signal 215 from neighbor base station 105-b is interfering with pilot signal 210 from serving base station 105-a. In some examples, the channel parameters may include information associated with error rates, with observed channel conditions, etc. For example, the channel parameters may include an indication of a frame error rate (FER), of a signal-to-noise interference rate (SIR), and the like.

At 225, the UE 115-a may determine whether the channel parameters have exceeded a predetermined threshold level. For example, the UE 115-a may determine whether the FER and/or the SIR have increased beyond a predetermined threshold value. The predetermined threshold value may also be associated with a timing component, e.g., a timer where the channel parameter must exceed the predetermined threshold for a minimal time period. Another timer may provide for a time period between instances of the channel parameters exceeding the predetermined threshold.

At 230, the UE 115-a may dynamically select a MAC algorithm from among a plurality of MAC algorithms available for communications. For example where the measured interference is increasing, the UE 115-a may select a more reliable MAC algorithm, e.g., switch from an un-coordinated MAC algorithm to a RTS/CTS MAC algorithm. Although the RTC/CTS MAC algorithm may be associated with additional overhead, the additional overhead may be acceptable in a high-interference situation. As another example where the interference is decreasing, the UE 115-a may select a lower latency MAC algorithm, e.g., switch from a coordinated MAC algorithm to a RTS/CTS MAC algorithm (or directly to an un-coordinated MAC algorithm). Although the RTC/CTS MAC algorithm may be more susceptible to interference, the improvement in latency may be preferred in a low-interference situation. Accordingly, the UE 115-a may select and switch between different MAC algorithms depending on the current channel parameters.

At 235, the UE 115-a may inform the serving base station 105-a of the selected MAC algorithm by sending a message 240. The message may include an indication of which MAC algorithm the UE 115-a has selected for communications based on the current interference level.

Figure 3:
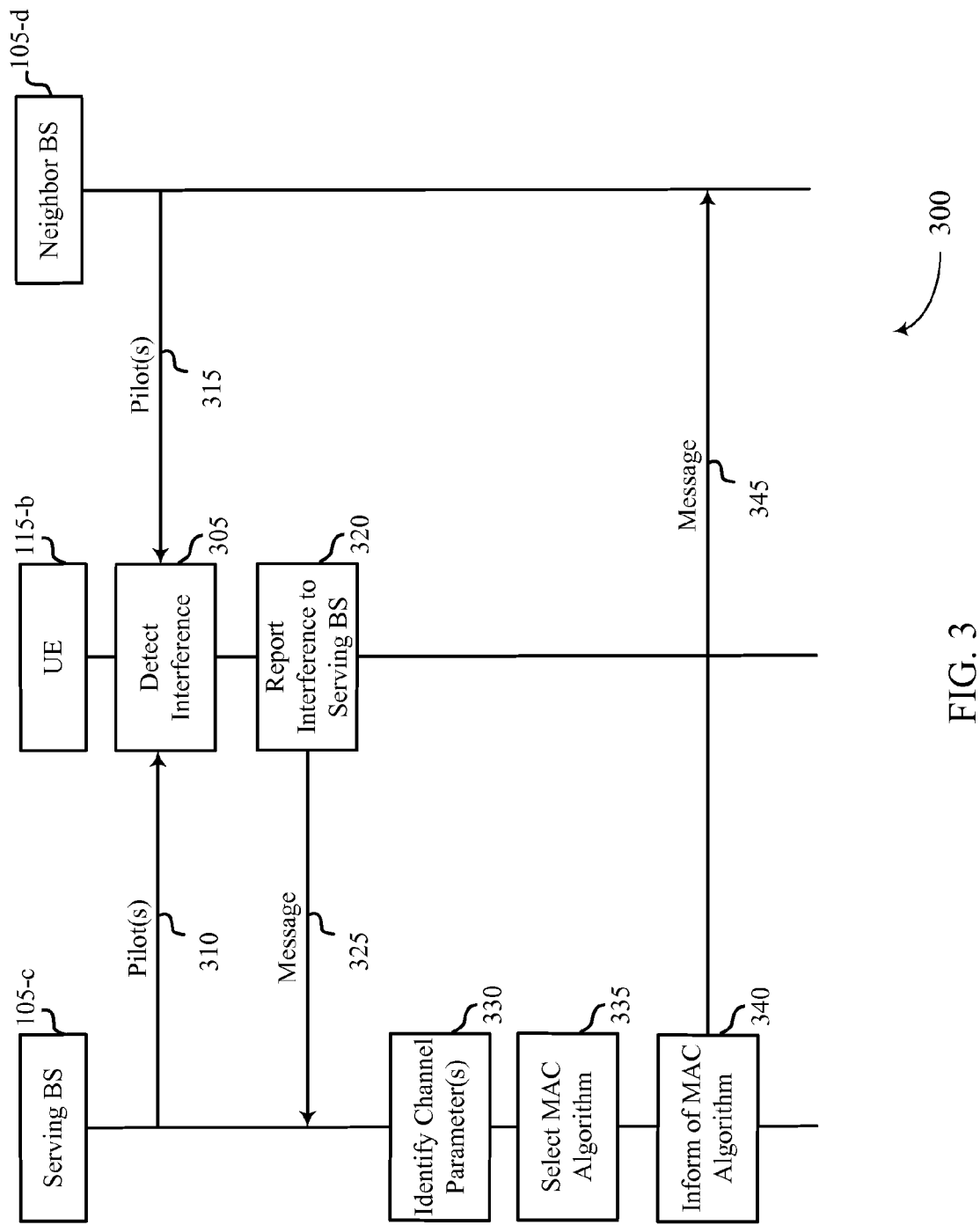
FIG. 3 shows a diagram of aspects of medium access control algorithm selection for use in a wireless communication, in accordance with various aspects of the present disclosure.

FIG. 3 is a diagram 300 illustrating aspects of dynamic MAC algorithm selection, in accordance with various aspects of the present disclosure. The diagram 300 may illustrate aspects of the system 100 described with reference to FIG. 1. The diagram 300 includes a serving base station 105-c, a UE 115-b, and a neighbor base station 105-d. The serving base station 105-c and/or the neighbor base station 105-d may be examples of one or more of the base stations 105 described above with respect to FIG. 1. The UE 115-b may be an example of one or more of the UEs 115 described with respect to FIG. 1. In some examples, the serving base station 105-c and/or the neighbor base station 105-d may be mmW base stations. In some examples, a system device, such as one of the base stations 105 and/or UEs 115 may execute one or more sets of codes to control the functional elements of the device to perform some or all of the functions described below.

At 305, the UE 115-b may detect interference associated with pilot signal 310 from serving base station 105-c and pilot signal 315 from neighbor base station 105-d. Based on the pilot signals, for example, UE 115-b may determine that communications from neighbor base station 105-d may interfere with communications with serving base station 105-c. In some examples, serving base station 105-c and neighbor base station 105-d may be mmW base stations and pilot signals 310 and 315 may be directional pilot signals. Base stations 105 may transmit the pilot signals using beamforming techniques such that a certain number of pilot signals may be transmitted, where each pilot signal may be transmitted in a different direction. Accordingly, the pilot signals may also include identification information, e.g., a pilot identity and/or information associated with the beamforming direction. In some examples, the pilot signals may also include load information.

At 320, the UE 115-b may report or otherwise inform the serving base station 105-c of the interference by sending a message 325. The UE 115-b may report the interference by sending the measured interference levels, the measured channel conditions, error rates, etc., or may sending information associated with such information.

At 330, the serving base station 105-c may identify the channel parameters based on the detected and reported interference. For example, the channel parameters may include information indicating that pilot signal 315 from neighbor base station 105-d is interfering with pilot signal 310 from serving base station 105-c. In some examples, the channel parameters may include information associated with error rates, with observed channel conditions, etc. For example, the channel parameters may include an indication of a frame error rate (FER), of a signal-to-noise interference rate (SIR), and the like. In other examples, the interference reported by the UE 115-b may include information identifying the channel parameters.

At 325, the serving base station 105-c may dynamically select a MAC algorithm from among a plurality of MAC algorithms available for communications. For example where the measured interference is increasing, the serving base station 105-c may select a more reliable MAC algorithm, e.g., switch from an un-coordinated MAC algorithm to a RTS/CTS MAC algorithm. Although the RTC/CTS MAC algorithm may be associated with additional overhead, the additional overhead may be acceptable in a high-interference situation. As another example where the interference is decreasing, the serving base station 105-c may select a lower latency MAC algorithm, e.g., switch from a coordinated MAC algorithm to a RTS/CTS MAC algorithm (or directly to an un-coordinated MAC algorithm). Although the RTC/CTS MAC algorithm may be more susceptible to interference, the improvement in latency may be preferred in a low-interference situation. Accordingly, the serving base station 105-c may select and switch between different MAC algorithms depending on the current channel parameters, as reported by the UE 115-b.

At 340, the serving base station 105-c may inform the neighbor base station 105-d of the selected MAC algorithm by sending a message 345. The message may include an indication of which MAC algorithm the serving base station 105-c has selected for communications with the UE 115-b, of which MAC algorithm the serving base station 105-c has selected for the neighbor base station 105-d to use for communications, or both. Accordingly, the serving base station 105-c and/or the neighbor base station 105-d may switch to the selected MAC algorithm for communications with their respective UEs 115.

Figure 4:
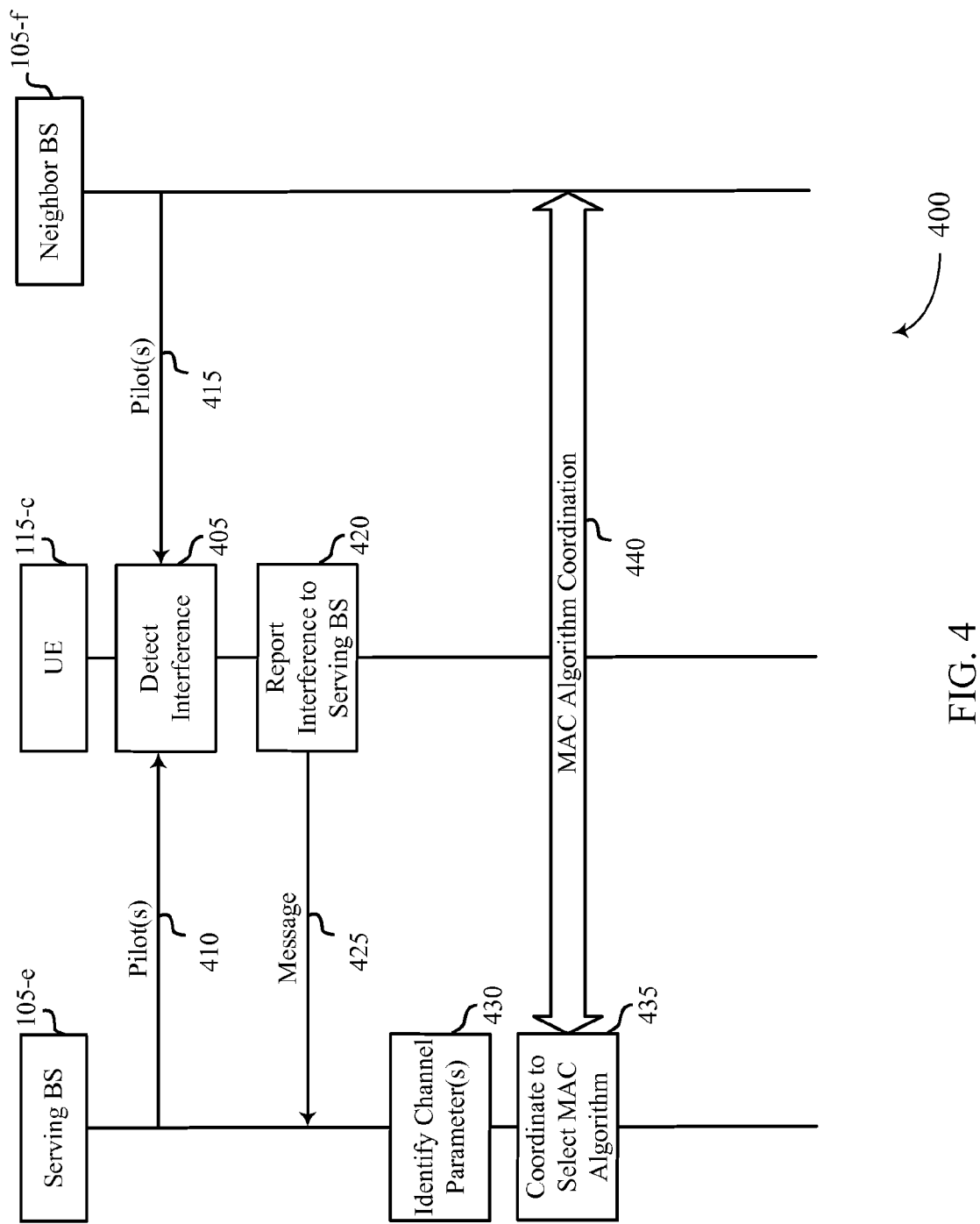
FIG. 4 shows a diagram of aspects of medium access control algorithm selection for use in a wireless communication, in accordance with various aspects of the present disclosure.

FIG. 4 is a diagram 400 illustrating aspects of dynamic MAC algorithm selection, in accordance with various aspects of the present disclosure. The diagram 400 may illustrate aspects of the system 100 described with reference to FIG. 1. The diagram 400 includes a serving base station 105-e, a UE 115-c, and a neighbor base station 105-f. The serving base station 105-c and/or the neighbor base station 105-f may be examples of one or more of the base stations 105 described above with respect to FIG. 1. The UE 115-c may be an example of one or more of the UEs 115 described with respect to FIG. 1. In some examples, the serving base station 105-e and/or the neighbor base station 105-f may be mmW base stations. In some examples, a system device, such as one of the base stations 105 and/or UEs 115 may execute one or more sets of codes to control the functional elements of the device to perform some or all of the functions described below.

At 405, the UE 115-c may detect interference associated with pilot signal 410 from serving base station 105-e and pilot signal 415 from neighbor base station 105-f. Based on the pilot signals, for example, UE 115-c may determine that communications from neighbor base station 105-f may interfere with communications with serving base station 105-e. In some examples, serving base station 105-e and neighbor base station 105-f may be mmW base stations and pilot signals 410 and 415 may be directional pilot signals. Base stations 105 may transmit the pilot signals using beamforming techniques such that a certain number of pilot signals may be transmitted, where each pilot signal may be transmitted in a different direction. Accordingly, the pilot signals may also include identification information, e.g., a pilot identity and/or information associated with the beamforming direction. In some examples, the pilot signals may also include load information.

At 420, the UE 115-c may report or otherwise inform the serving base station 105-e of the interference by sending a message 425. The UE 115-c may report the interference by sending the measured interference levels, the measured channel conditions, error rates, etc., or may sending information associated with such information.

At 430, the serving base station 105-e may identify the channel parameters based on the detected and reported interference. For example, the channel parameters may include information indicating that pilot signal 415 from neighbor base station 105-f is interfering with pilot signal 410 from serving base station 105-e. In some examples, the channel parameters may include information associated with error rates, observed channel conditions, etc. For example, the channel parameters may include an indication of a frame error rate (FER), of a signal-to-noise interference rate (SIR), and the like. In other examples, the interference reported by the UE 115-c may include information identifying the channel parameters.

At 325, the serving base station 105-c may dynamically select a MAC algorithm from among a plurality of MAC algorithms available for communications by coordinating with neighbor base station 105-f at 440. In some examples, the serving base station 105-e may determine a loading factor of the neighbor base station 105-f and select the MAC algorithm based on the loading factor. For example, the coordinating may include the serving base station 105-e sending a message to the neighbor base station 105-f requesting its current and/or scheduled traffic load. The neighbor base station 105-f may respond with a message informing the serving base station 105-e of its traffic conditions. The serving base station 105-e may select the MAC algorithm based on the traffic conditions of the neighbor base station 105-f.

As one example, if the interference detected at 405 was due to a temporary spike in traffic load of the neighbor base station 105-f, the traffic condition reported by the neighbor base station 105-f may indicate that no further traffic is scheduled. Accordingly, the serving base station 105-e may select a MAC algorithm based on the low traffic loading factor of the neighbor base station 105-f. As another example where the neighbor base station 105-f is experiencing a high traffic load, the serving base station 105-e may select a MAC algorithm that considers the high traffic load of the neighbor base station 105-f and reduces or eliminates interference caused by the high traffic load.

Figure 5:
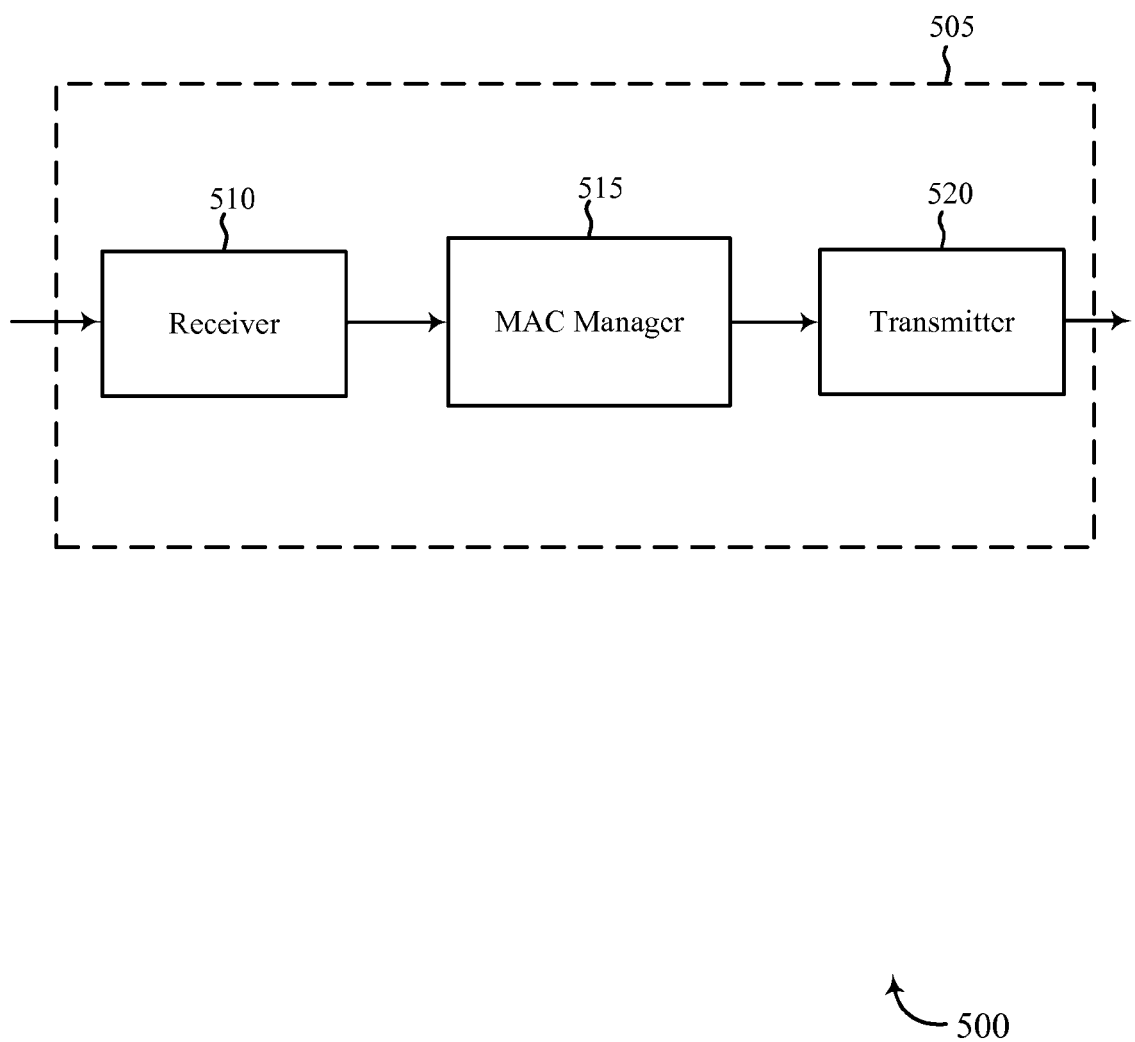
FIG. 5 shows a block diagram of a device configured for use in wireless communication, in accordance with various aspects of the present disclosure.

FIG. 5 shows a block diagram 500 of a device 505 for use in wireless communication, in accordance with various aspects of the present disclosure. In some examples, the device 505 may be an example of one or more aspects of a UE 115 described with reference to FIGS. 1-4. In some examples, the device 505 may be an example of one or more aspects of a base station 105 described with reference to FIGS. 1-4. The device 505 may include a receiver 510, a MAC manager 515, and/or a transmitter 520. The device 505 may also be or include a processor (not shown). Each of these modules may be in communication with each other.

The components of the device 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver 510 may receive information such as packets, user data, and/or control information associated with various information channels (e.g., control channels, data channels, etc.). The receiver 510 may be configured to receive various signals associated with MAC algorithm selection and communications. Information may be passed on to the MAC manager 515, and to other components of the device 505.

The MAC manager 515 may monitor, control, or otherwise manage one or more aspects of selection and communications for the device 505. For example, the MAC manager 515 may, alone or in cooperation with other components of the device 505, manage aspects of identifying a channel parameter associated with a first channel used for communications in a wireless communications system. The wireless communication system may be a mmW wireless communication system and the communications may use directional or beamformed transmissions. The channel parameter may include or indicate information such as an interference level for the first channel, a frame error rate associated with the first channel, a signal-to-interference ratio associated with the first channel, and the like. The MAC manager 515 may dynamically select, based on the channel parameter, a first MAC algorithm from a plurality of MAC algorithms available for communications using the first channel. The selected MAC algorithm may provide a mechanism for the device 505 to access a medium of the wireless communication system for communications that reduces or eliminates interference, signal-to-interference, etc. Examples of the plurality of MAC algorithms available for communications may include, but are not limited to, an un-coordinated MAC algorithm, a RTS/CTS MAC algorithm, and a coordinated MAC algorithm.

The transmitter 520 may transmit the one or more signals received from other components of the device 505. The transmitter 520 may transmit various signals associated with MAC algorithm selection and communications. In some examples, the transmitter 520 may be collocated with the receiver 510 in a transceiver module.

Figure 6:
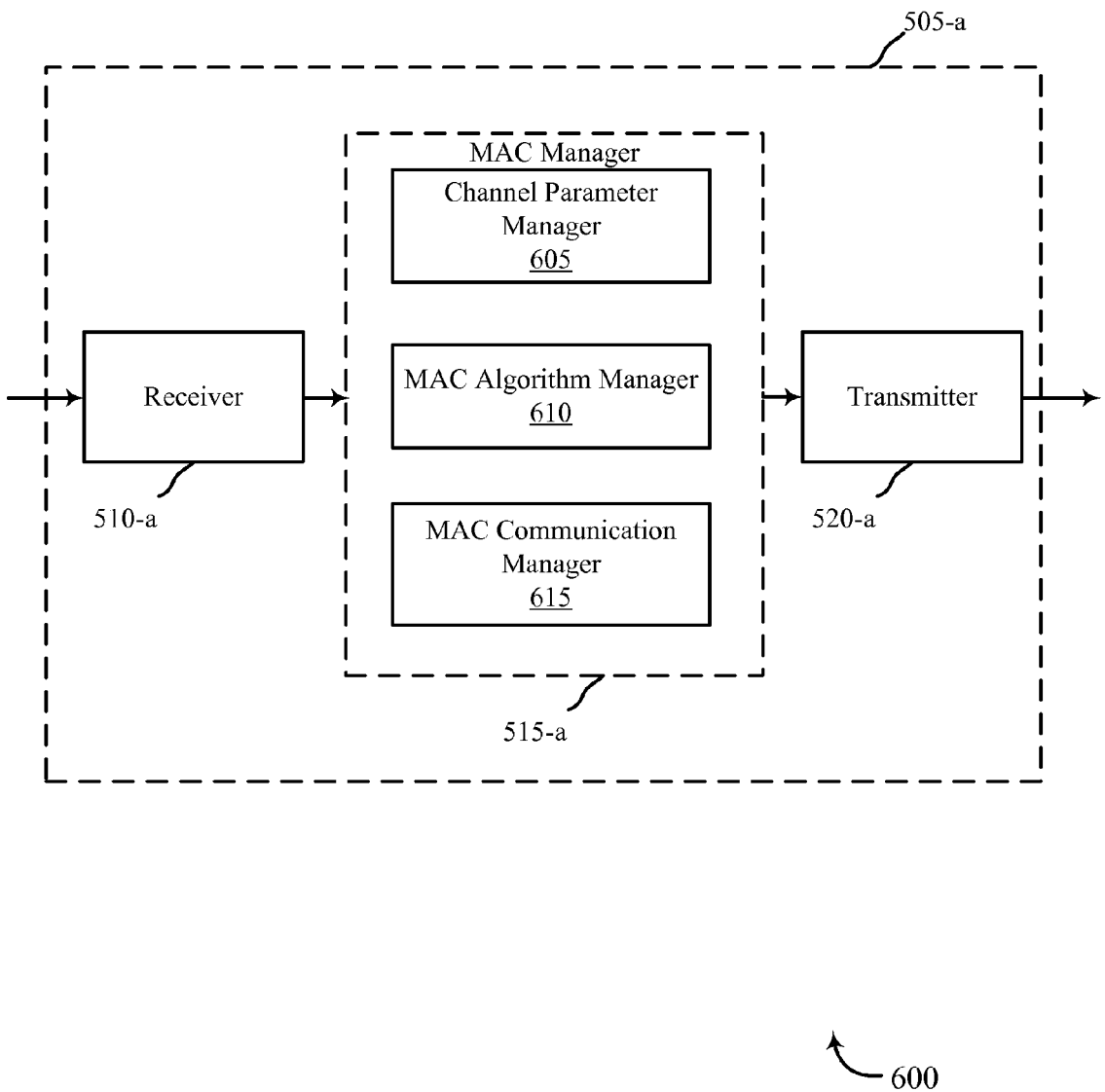
FIG. 6 shows a block diagram of a device configured for use in wireless communication, in accordance with various aspects of the present disclosure.

FIG. 6 shows a block diagram 600 of a device 505-*a* for use in wireless communication, in accordance with various examples. In some examples, the device 505-*a* may be an example of one or more aspects of a UE 115 described with reference to FIGS. 1-4. In some examples, the device 505-*a* may be an example of one or more aspects of a base station 105 described with reference to FIGS. 1-4. It may also be an example of a device 505 described with reference to FIG. 5. The device 505-*a* may include a receiver 510-*a*, a MAC manager 515-*a*, and/or a transmitter 520-*a*, which may be examples of the corresponding modules of device 505. The device 505-*a* may also include a processor (not shown). Each of these components may be in communication with each other. The MAC manager 515-*a* may include a channel parameter manager 605, a MAC algorithm manager 610, and/or MAC communication manager 615. The receiver 510-*a* and the transmitter 520-*a* may perform the functions of the receiver 510 and the transmitter 520 of FIG. 5, respectively.

The channel parameter manager 605 may monitor, control, or otherwise manage one or more aspects of identifying channel parameters for the device 505-*a*. For example, the channel parameter manager 605 may identify a channel parameter associated with a first channel used for communications in a wireless communication system. In some aspects, the first channel may be used for communications between a serving base station and a UE. In some non-limiting examples, the wireless communication system may be a mmW wireless communication system and the communications may use directional or beamformed transmissions. For example, the first channel may be associated with a first beam direction and there may be additional channels, e.g., a second channel, that are associated with a second beam direction.

In some aspects, the channel parameter manager 605 may identify the channel parameters by receiving a first pilot signal from a serving base station and a second pilot signal from a neighbor base station. One or more of the pilot signals may include a load indicator from the respective base station. For example, the first pilot signal from the serving base station may include information indicating a load attribute of the communication channel associated with first pilot signal. Similarly, the pilot signal from the neighbor base station may include information indicating a load attribute of the communication channel associated with the second pilot signal. The load indicator may include a flag or information element (IE) that conveys an indication of the load or amount of traffic the base station is communicating for the associated channel. For example, the load indicator may indicate the base station is communicating heavy traffic, light traffic, etc., for the channel. In some examples, the pilot signal may also include information indicative of an amount of data to be communicated and/or scheduling information associated with communicating the information.

In some aspects, the pilot signals may include identifying information. In an example of the mmW wireless communication system, the pilot signals may be directional pilot signals where the pilot signals transmitted in each direction may be associated with a unique identifier. As one example, the base station may transmit a pilot signal in every 90 degree direction, wherein each pilot signal has its own identifier. It will be appreciated that the base station may transmit pilot signals (or communications) in other directional increments, e.g., every 30 degrees, every 45 degrees, every 60 degrees, every 120 degrees, every 180 degrees, etc. Each pilot signal (or communication) transmitted in a different direction may be associated with a unique identifier. The base station may transmit the pilot signals (or communications) using different channels or the same channel or frequency.

In some aspects, the channel parameter manager 605 may identify the channel parameters by determining that a pilot signal from the neighbor base station is causing interference with the pilot signal from the serving base station. For example, the interference may result in an increased signal-to-interference ratio, a signal-to-noise interference ratio, etc. The interference may also result in an increased frame error rate and the like. Based on the pilot signals (or other communications), the channel parameter manager 605 may identify a variety of channel conditions, error metrics, and the like associated with interference and determine the channel parameters accordingly. Accordingly based on the description above, the channel parameter manager 605 may determine for the first and second pilot signals, the respective traffic load, the directions the pilot signals are being transmitted from, and the identifiers of the pilot signals. As such, the channel parameters may include an indication that, for example, pilot signal 3 from neighbor base station is interfering with pilot signal 7 from serving base station.

In some examples where the device 505-*a* is a UE, the channel parameter manager 605 may determine the channel parameters based on the received pilot signals and/or other channel conditions, such as is described above. In other examples where the device 505-*a* is a base station, the channel parameter manager 605 may determine the channel parameters based on one or more messages received from the UE. For example, the UE may transmit a message to the serving base station that indicates the channel parameters or otherwise conveys an indication of the interference levels. Based on the message(s) received from the UE, the channel parameter manager 605 may identify the channel parameters using any of the techniques described above.

The MAC algorithm manager 610 may monitor, control, or otherwise manage one or more aspects of selecting a MAC algorithm for the device 505-*a*. For example, the MAC algorithm manager 610 may dynamically select a first MAC algorithm from a plurality of MAC algorithms available for communications using the first channel. The MAC algorithm manager 610 mays select the MAC algorithm based on the channel parameters associated with the first channel. The plurality of MAC algorithms available for communications may include an un-coordinated MAC algorithm, an RTS/CTS MAC algorithm, and a coordinated MAC algorithm. Generally, the un-coordinated MAC algorithm may be associated with blind transmission attempts to capture the medium (e.g., the first channel). The blind access attempts may have no overhead requirements, but may be associated with increased collisions or interference (particularly as the traffic load increases). Generally, the RTS/CTS MAC algorithm may use the request/clear to send protocols described above to access the medium. The RTS/CTS algorithm may have more overhead than the un-coordinated MAC algorithm, but may reduce instances of collision or interference as the traffic load increases (e.g., as more UEs are available for communications). Generally, the coordinated MAC algorithm may include the base stations exchanging messages to coordinate medium access. While this may reduce or eliminate collisions or interference, it may be associated with more overhead signaling than the RTS/CTS MAC algorithm, for example. Accordingly, each of the plurality of available MAC algorithms may have distinct advantages and drawbacks and may be suited for differing channel parameters (e.g., to reduce or control interference).

In some aspects, the MAC algorithm manager 610 may manage one or more aspects of selecting a second MAC algorithm from the plurality of available MAC algorithms for communications using a second channel of the wireless communication system. As discussed above, base stations may communicate using directional or beamformed transmissions where each direction may include communications using a different channel. In some examples, the MAC algorithm manager 610 may select the first MAC algorithm for communications using the first channel and may select a second MAC algorithm for communications using a second channel. The MAC algorithm manager 610 may select different MAC algorithms on a per/channel basis, e.g., a MAC algorithm for each channel (or direction) may be different from or the same as MAC algorithms being used for other channels (or directions).

In some examples where the device 505-a is a UE, the MAC algorithm manager 610 may manage one or more aspects of selecting the MAC algorithm for the UE. That is, the UE may select the MAC algorithm from the available MAC algorithms and send a message to the serving base station informing it of the selected MAC algorithm. Accordingly, the serving base station may adopt the MAC algorithm selected by the UE. Moreover, the MAC algorithm manager 610 may select the MAC algorithm based on the channel parameter exceeding a predetermined threshold. For example, channel parameter (e.g., FER, SIR, etc.) may increase beyond a predetermined value and this may trigger the MAC algorithm manager 610 to select a MAC algorithm for communications using the respective channel.

In other examples where the device 505-a is a base station, the MAC algorithm manager 610 may manage one or more aspects of selecting the MAC algorithm for the base station. For example, the base station may receive a message from the UE conveying an indication of the channel parameters for the first channel (or information used by the base station to identify the channel parameters) and dynamically select the MAC algorithm based on the channel parameters. The serving base station may send a message to the neighbor base station informing it of the selected MAC algorithm. The serving base station and/or the neighbor base station may use the selected MAC algorithm for communications.

In some examples, the serving base station may coordinate with the neighbor base station to select the MAC algorithm. For example, the serving base station may send a message to the neighbor base station requesting an indication of the traffic load the neighbor base station is experiencing or has scheduled. The neighbor may respond by sending a message to the serving base station that conveys the requested traffic load indicator. The serving base station may select the MAC algorithm based on the load indicator and send a message to the neighbor base station informing it of the selected MAC algorithm. Accordingly, the serving base station may select the MAC algorithm responsive to the traffic load of the neighbor base station.

In some aspects, the MAC algorithm manager 610 may manage one or more aspects of selecting a second MAC algorithm for use in communications using a second channel. As discussed, each base station may communicate in a plurality of different directions. The MAC algorithm manager 610 may select a MAC algorithm from the plurality of available MAC algorithms, wherein different MAC algorithms may be selected for each or some of the communication directions. Each MAC algorithm may be selected based on channel parameters associated with the respective communication direction.

The MAC algorithm manager 610 may select a MAC algorithm for communications using the first channel dynamically or in real-time. That is, the device 505-a may continuously or periodically monitor or determine the channel parameters and, as the channel parameters change or reach a predefined metric, the MAC algorithm manager 610 may update or change the selected MAC algorithm responsive to the current channel parameters. Accordingly, the MAC algorithm for the first channel and other channels may be updated in response to changing communication parameters, e.g., as communication device density and/or position increases, to minimize or eliminate collisions or interference.

The MAC communication manager 615 may monitor, control, or otherwise manage one or more aspects of communicating using the selected MAC algorithm for the device 505-a. For example, the MAC communication manager 615 may manage aspects of communicating on the first channel using the selected first MAC algorithm. In some examples, the MAC communication manager 615 may manage aspects of communicating on different channels, where some or all of the communication channels use a different MAC algorithm.

In some aspects, the MAC communication manager 615 may manage aspects of communicating on channels using the respective MAC algorithm, where each channel is a directional or beamformed communication channel. For example, the MAC communication manager 615 may, alone or in cooperation with the receiver 510-a and/or transmitter 520-a, mange aspects of conducting communications on the respective channels with one or more other communication devices.

Figure 7:
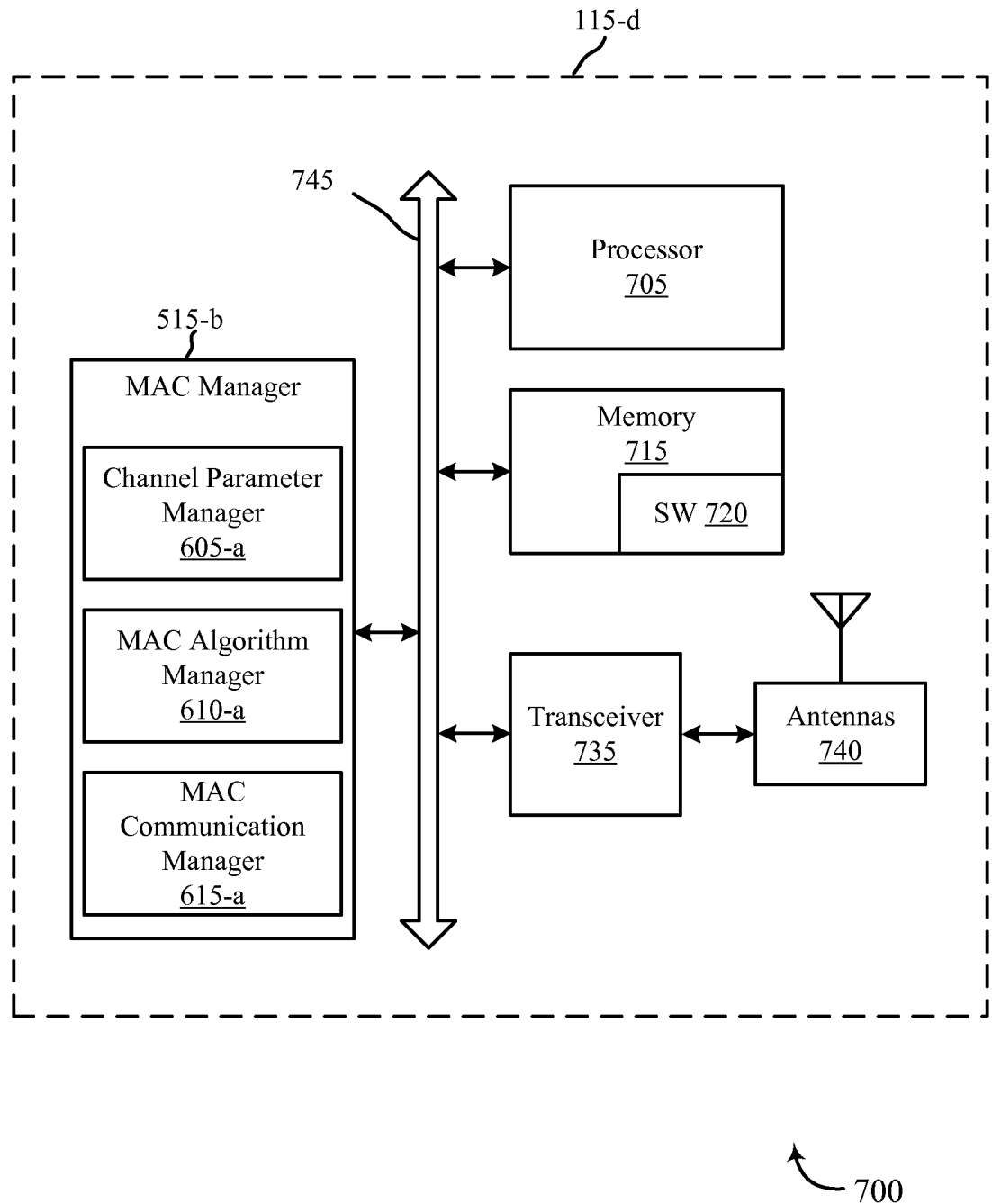
FIG. 7 shows a block diagram of a user equipment for use in wireless communications, in accordance with various aspects of the present disclosure.

FIG. 7 illustrates a block diagram of portions of a system 700 including a user equipment 115-d for use in wireless communication, in accordance with various aspects of the present disclosure. In some examples, the UE 115-d may be an example of the UEs 115 described with respect to FIGS. 1-4, and/or devices 505 of FIGS. 5 and 6. UE 115-d may include a MAC manager 515-b which may be an example of and perform the functions of the MAC manager 515 described with respect to FIGS. 5 and 6. UE 115-d may include components for bi-directional voice and data communications including components for transmitting communications and components for receiving communications. For example, UE 115-d may communicate bi-directionally with base stations and/or other UEs.

UE 115-d may include a processor 705, and memory 715 (e.g., including software (SW)) 720, a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with a base station or another UE. The transceiver 735 may include a modem to modulate the packets and provide the modulated packets to the antenna(s) 740 for transmission, and to demodulate packets received from the antenna(s) 740. While UE 115-d may include a single antenna 740, UE 115-d may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor 805 to perform various functions described herein (e.g., signaling protocols for MAC algorithm selection and sharing, etc.). Alternatively, the software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an ASIC, etc.).

The MAC manager 515-b may be configured to perform and/or control some or all of the features and/or functions described with reference to FIGS. 1-6 related to MAC algorithm selection and reporting operations for the UE 115-d. In some examples, the MAC manager 515-b may identify a channel parameter associated with a first channel used for communications in a wireless communication system and may dynamically select, based at least in part on the channel parameter, a first MAC algorithm from a plurality of MAC algorithms available for communications using the first channel. The MAC manager 515-b, or portions thereof, may include a processor, and/or some or all of the functions of the MAC manager 515-b may be performed by the processor 705 and/or in connection with the processor 705. In some examples, the MAC manager 515-b may be an example of the MAC manager 515 described with reference to FIGS. 5, and/or 6. For example, the MAC manager 515-b may include a channel parameter manager 605-a, a MAC algorithm manager 610-a, and/or MAC communication manager 615-a, which may be examples of and perform the functions of the channel parameter manager 605, the MAC algorithm manager 610, and/or the MAC communication manager 615, respectively, described with reference to FIG. 6.

Figure 8:
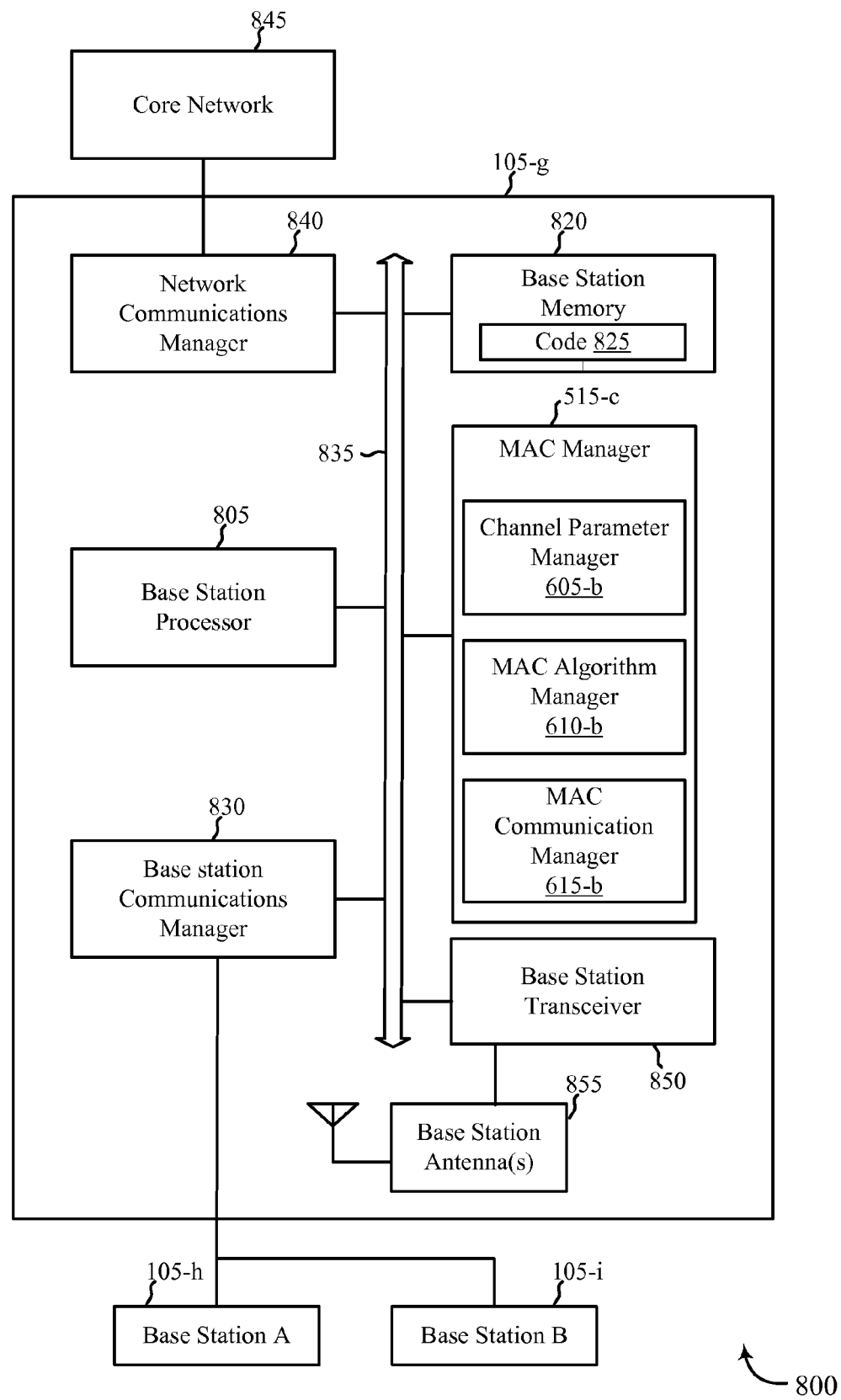
FIG. 8 shows a block diagram of a base station (e.g., a base station forming part or all of an eNB) for use in wireless communication, in accordance with various aspects of the present disclosure.

FIG. 8 shows a block diagram 800 of a base station 105-g (e.g., a base station forming part or all of an eNB) for use in wireless communication, in accordance with various aspects of the present disclosure. In some examples, the base station 105-g may be an example of aspects of one or more of the base stations 105 described with reference to FIGS. 1-4, and/or aspects of one or more of the devices 505 when configured as a base station, as described with reference to FIGS. 5 and/or 6. The base station 105-g may be configured to implement or facilitate at least some of the base station and/or device features and functions described with reference to FIGS. 1-7.

The base station 105-g may include a base station processor 810, a base station memory 820, at least one base station transceiver (represented by base station transceiver 850), at least one base station antenna (represented by base station antenna(s) 855), and/or a MAC manager 515-c. The base station 105-g may also include one or more of a base station communications manager 830 and/or a network communications manager 840. Each of these modules may be in communication with each other, directly or indirectly, over one or more buses 835.

The base station memory 820 may include random access memory (RAM) and/or read-only memory (ROM). The base station memory 820 may store computer-readable, computer-executable software/firmware code 825 containing instructions that are configured to, when executed, cause the base station processor 810 to perform various functions described herein related to wireless communication (e.g., to perform signaling protocols for MAC algorithm selection and reporting operations in a wireless communication system, etc.). Alternatively, the computer-readable, computer-executable software/firmware code 825 may not be directly executable by the base station processor 810 but be configured to cause the base station 105-g (e.g., when compiled and executed) to perform various of the functions described herein.

The base station processor 810 may include an intelligent hardware device, e.g., a central processing unit (CPU), a microcontroller, an ASIC, etc. The base station processor 810 may process information received through the base station transceiver 850, the base station communications manager 830, and/or the network communications manager 840. The base station processor 810 may also process information to be sent to the base station transceiver 850 for transmission through the antenna(s) 855, to the base station communications manager 830, for transmission to one or more other base stations 105-h and 105-i, and/or to the network communications manager 840 for transmission to a core network 845, which may be an example of one or more aspects of the core network 130 described with reference to FIG. 1. The base station processor 810 may handle, alone or in connection with the MAC manager 515-c, various aspects of MAC algorithm selecting and reporting operations for the base station 105-g.

The base station transceiver 850 may include a modem configured to modulate packets and provide the modulated packets to the base station antenna(s) 855 for transmission, and to demodulate packets received from the base station antenna(s) 855. The base station transceiver 850 may, in some examples, be implemented as one or more base station transmitter modules and one or more separate base station receiver modules. The base station transceiver 850 may support communications in a first radio frequency spectrum band and/or a second radio frequency spectrum band. The base station transceiver 850 may be configured to communicate bi-directionally, via the antenna(s) 855, with one or more UEs or devices, such as one or more of the UEs 115 described with reference to FIGS. 1-4. The base station 105-g may, for example, include multiple base station antennas 855 (e.g., an antenna array). The base station 105-g may communicate with the core network 845 through the network communications manager 840. The base station 105-g may also communicate with other base stations, such as the base stations 105-h and 105-i, using the base station communications manager 830.

The MAC manager 515-c may be configured to perform and/or control some or all of the features and/or functions described with reference to FIGS. 1-6 related to MAC algorithm selection and reporting operations for the base station 105-g. In some examples, the MAC manager 515-c may identify a channel parameter associated with a first channel used for communications in a wireless communication system and may dynamically select, based at least in part on the channel parameter, a first MAC algorithm from a plurality of MAC algorithms available for communications using the first channel. The MAC manager 515-c, or portions thereof, may include a processor, and/or some or all of the functions of the MAC manager 515-c may be performed by the base station processor 810 and/or in connection with the base station processor 810. In some examples, the MAC manager 515-c may be an example of the MAC manager 515 described with reference to FIGS. 5, and/or 6. For example, the MAC manager 515-c may include a channel parameter manager 605-b, a MAC algorithm manager 610-b, and/or MAC communication manager 615-b, which may be examples of and perform the functions of the channel parameter manager 605, the MAC algorithm manager 610, and/or the MAC communication manager 615, respectively, described with reference to FIG. 6.

Figure 9:
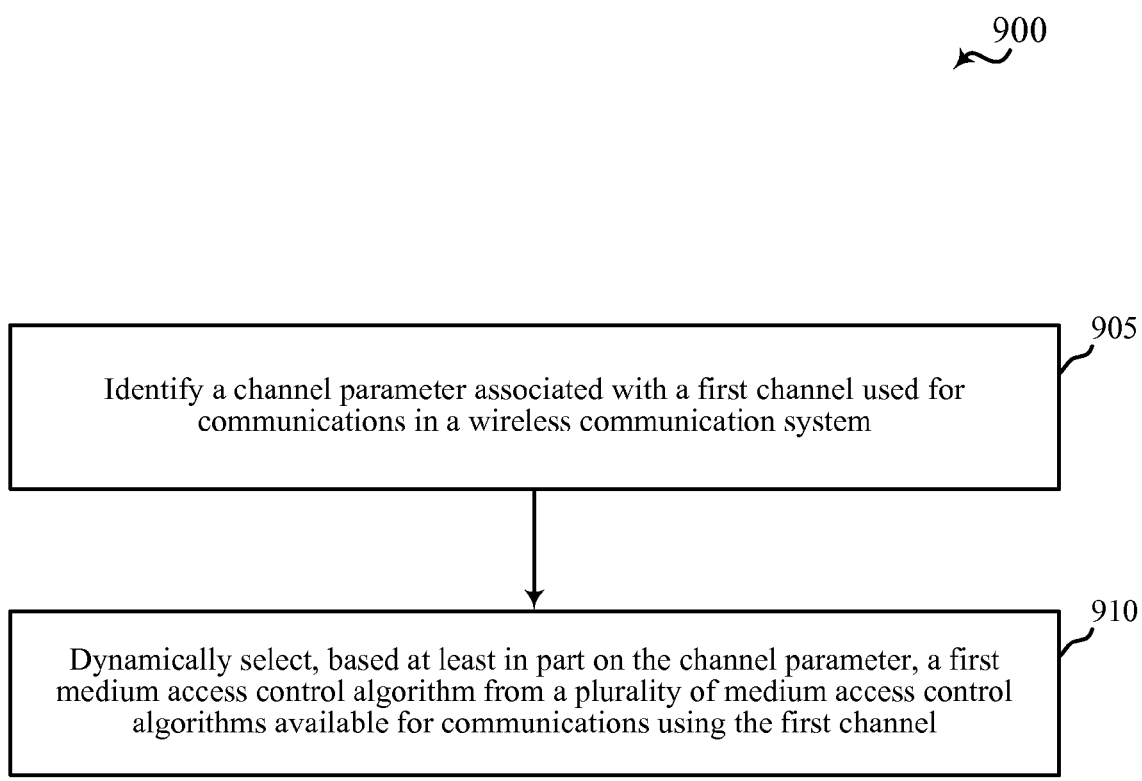
FIG. 9 is a flow chart illustrating an example of a method for wireless communication, in accordance with various aspects of the present disclosure.

FIG. 9 shows a flowchart illustrating a method 900 for wireless communications, in accordance with various aspects of the present disclosure. The operations of method 900 may be implemented by a UE 115 or its components, by a base station 105 or its components, and/or by a device 505 as described with reference to FIGS. 1-8. For example, the operations of method 900 may be performed by the MAC manager 515 as described with reference to FIGS. 5-8. In some examples, a UE 115 or a base station 105 may execute a set of codes to control the functional elements of the UE 115 or base station 105 to perform the functions described below. Additionally or alternatively, the UE 115 or base station 105 may perform aspects of the functions described below using special-purpose hardware. For convenience, the functions of the method 900 will be described with reference to a device, such as a device 505 of FIGS. 5 and 6.

At block 905, the method 900 may include the device identifying a channel parameter associated with a first channel used for communications in a wireless communication system. The channel parameter may indicate an interference level associated with communications using the first channel, e.g., a frame error rate, a signal-to-interference ration, etc. In some examples, the first channel may be a directional or beamformed communications channel. In some examples, the wireless communication system may be a mmW wireless communication system.

At block 910, the method 900 may include the device dynamically selecting, based at least in part on the channel parameter, a first MAC algorithm from a plurality of MAC algorithms available for communications using the first channel. Examples of the multiple MAC algorithms available for communications using the first channel may include an un-coordinated MAC algorithm, a RTS/CTS MAC algorithm, and a coordinated MAC algorithm. Other MAC algorithms may also be utilized in accordance with aspects of the present disclosure.

The operation(s) at blocks 905 and/or 910 may be performed using the MAC manager 515 described with reference to FIGS. 5-8.

Thus, the method 900 may provide for wireless communication. It should be noted that the method 900 is just one implementation and that the operations of the method 900 may be rearranged or otherwise modified such that other implementations are possible.

Figure 10:
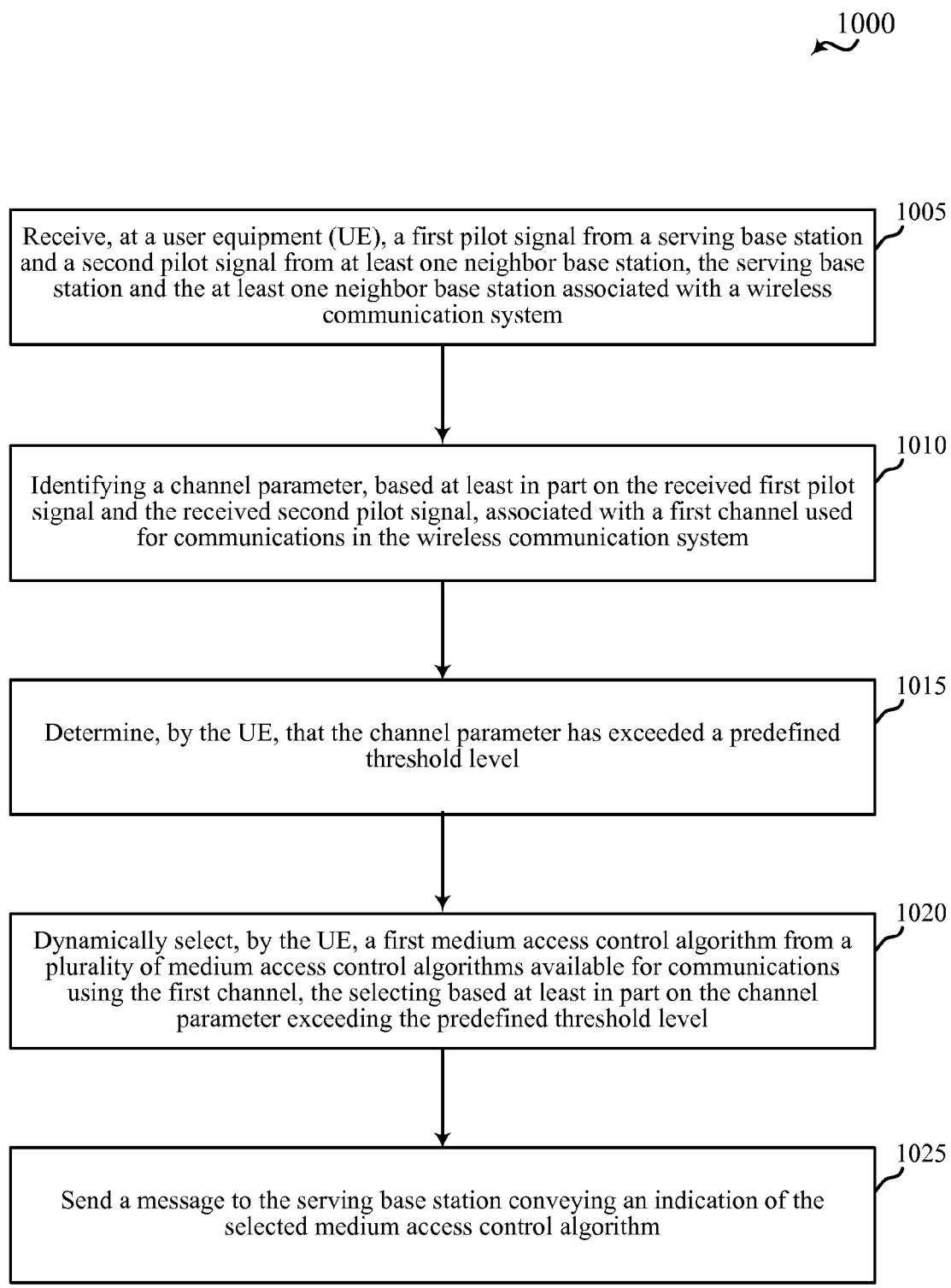
FIG. 10 is a flow chart illustrating an example of a method for wireless communication, in accordance with various aspects of the present disclosure.

FIG. 10 shows a flowchart illustrating a method 1000 for wireless communications, in accordance with various aspects of the present disclosure. The operations of method 1000 may be implemented by a UE 115 or its components, and/or by a device 505 as described with reference to FIGS. 1-7. For example, the operations of method 1000 may be performed by the MAC manager 515 as described with reference to FIGS. 5-7. In some examples, a UE 115 may execute a set of codes to control the functional elements of the UE 115 to perform the functions described below. Additionally or alternatively, the UE 115 may perform aspects of the functions described below using special-purpose hardware. For convenience, the functions of the method 1000 will be described with reference to a UE, such as a UE 115.

At block 1005, the method 1000 may include the UE receiving a first pilot signal from a serving base station and from at least one neighbor base station. The serving base station and the at least one neighbor base station may be associated with a wireless communication system. In some examples, the wireless communication system may be a mmW wireless communication system.

At block 1010, the method 1000 may include the UE identifying a channel parameter associated with a first channel used for communications in a wireless communication system. The channel parameter may be identified based on the received first pilot signal and the received second pilot signal. The channel parameter may indicate an interference level associated with communications using the first channel, e.g., a frame error rate, a signal-to-interference ration, etc. In some examples, the first channel may be a directional or beamformed communications channel.

At block 1015, the method 1000 may include the UE determining that the channel parameter has exceeded a predefined threshold level. For example, the frame error rate and/or the signal-to-interference level associated with the channel parameter may have increased beyond the predefined threshold level or value and may, in some examples, remained above the predefined threshold level for a certain time period, e.g., to prevent frequent oscillations above and below the threshold level.

At block 1020, the method 1000 may include the UE dynamically selecting, based at least in part on the channel parameter exceeding the predefined threshold level, a first MAC algorithm from a plurality of MAC algorithms available for communications using the first channel. Examples of the multiple MAC algorithms available for communications using the first channel may include an un-coordinated MAC algorithm, a RTS/CTS MAC algorithm, and a coordinated MAC algorithm. Other MAC algorithms may also be utilized in accordance with aspects of the present disclosure.

At block 1025, the method 1000 may include the UE sending a message to the serving base station conveying an indication of the selected MAC algorithm. Accordingly, the UE may inform the serving base station of the selected MAC algorithm based on the channel parameters.

The operation(s) at blocks 1005, 1010, 1015, 1020 and/or 1025 may be performed using the MAC manager 515 described with reference to FIGS. 5-7.

Thus, the method 1000 may provide for wireless communication. It should be noted that the method 1000 is just one implementation and that the operations of the method 1000 may be rearranged or otherwise modified such that other implementations are possible.

Figure 11:
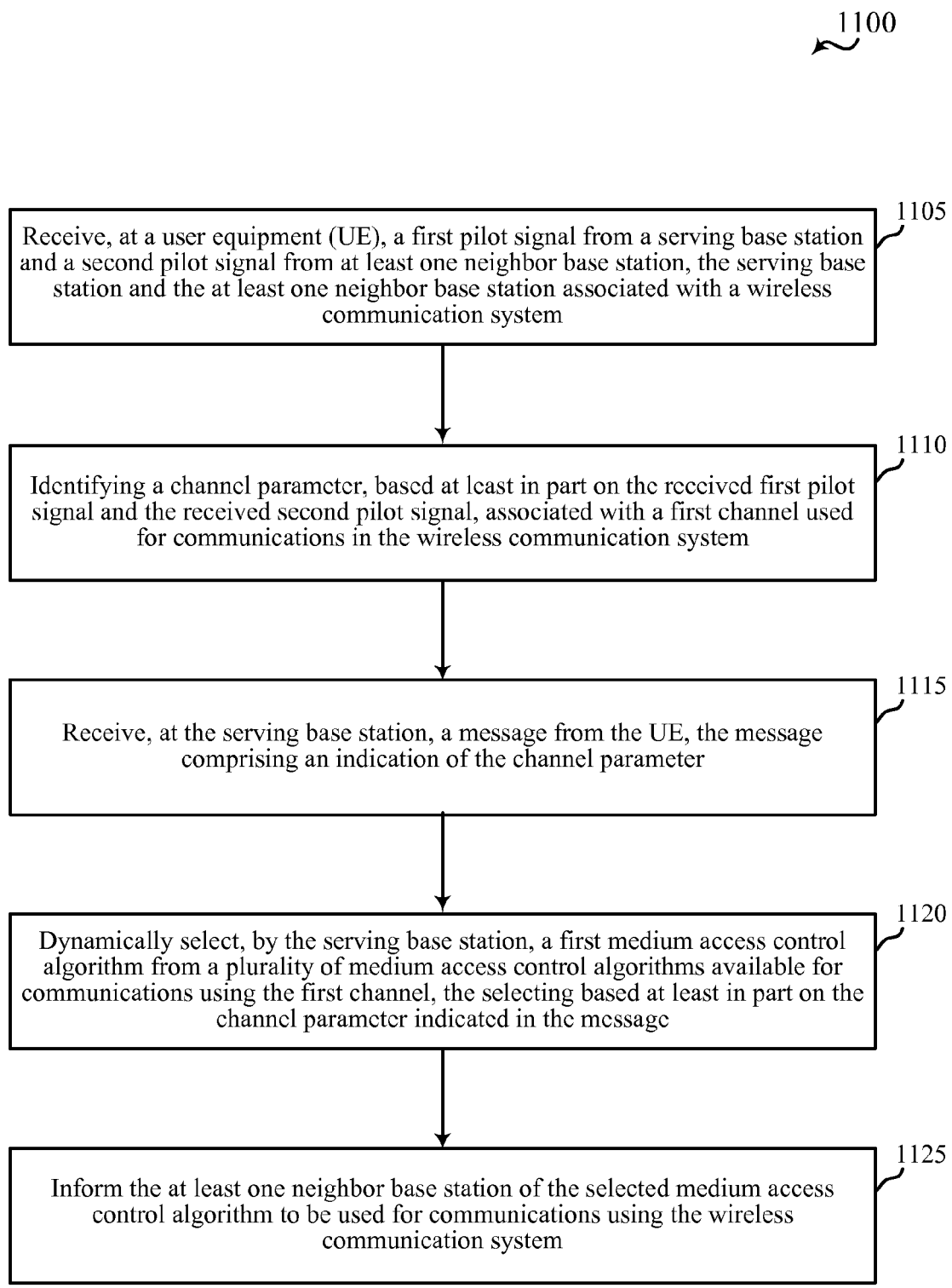
FIG. 11 is a flow chart illustrating an example of a method for wireless communication, in accordance with various aspects of the present disclosure.

FIG. 11 shows a flowchart illustrating a method 1100 for wireless communications, in accordance with various aspects of the present disclosure. The operations of method 1100 may be implemented by a base station 105 or its components, and/or by a device 505 as described with reference to FIGS. 1-6 and 8. For example, the operations of method 1100 may be performed by the MAC manager 515 as described with reference to FIGS. 5, 6, and 8. In some examples, a base station 105 may execute a set of codes to control the functional elements of the base station 105 to perform the functions described below. Additionally or alternatively, the base station 105 may perform aspects of the functions described below using special-purpose hardware. For convenience, the functions of the method 1100 will be described with reference to a serving base station, such as a base station 105.

At block 1105, the method 1100 may include a UE receiving a first pilot signal from a serving base station and from at least one neighbor base station. The serving base station and the at least one neighbor base station may be associated with a wireless communication system. In some examples, the wireless communication system may be a mmW wireless communication system.

At block 1110, the method 1100 may include the UE identifying a channel parameter associated with a first channel used for communications in a wireless communication system. The channel parameter may be identified based on the received first pilot signal and the received second pilot signal. The channel parameter may indicate an interference level associated with communications using the first channel, e.g., a frame error rate, a signal-to-interference ration, etc. In some examples, the first channel may be a directional or beamformed communications channel.

At block 1115, the method 1100 may include receiving, at the serving base station, a message from the UE conveying an indication of the channel parameter. The message may convey the channel parameter, information associated with the channel parameter, and/or information associated with a detected interference level.

At block 1120, the method 1100 may include the serving base station dynamically selecting, based at least in part on the channel parameter indicated in the message from the UE, a first MAC algorithm from a plurality of MAC algorithms available for communications using the first channel. Examples of the multiple MAC algorithms available for communications using the first channel may include an un-coordinated MAC algorithm, a RTS/CTS MAC algorithm, and a coordinated MAC algorithm. Other MAC algorithms may also be utilized in accordance with aspects of the present disclosure.

At block 1125, the method 1100 may include the serving base station sending a message to the neighbor base station conveying an indication of the selected MAC algorithm. Accordingly, the serving base station may inform the neighbor base station of the selected MAC algorithm that is to be used by the serving base station, the neighbor base station, or both base stations.

The operation(s) at blocks 1105, 1110, 1115, 1120 and/or 1125 may be performed using the MAC manager 515 described with reference to FIG. 5, 6, or 8.

Thus, the method 1100 may provide for wireless communication. It should be noted that the method 1100 is just one implementation and that the operations of the method 1100 may be rearranged or otherwise modified such that other implementations are possible.

Figure 12:
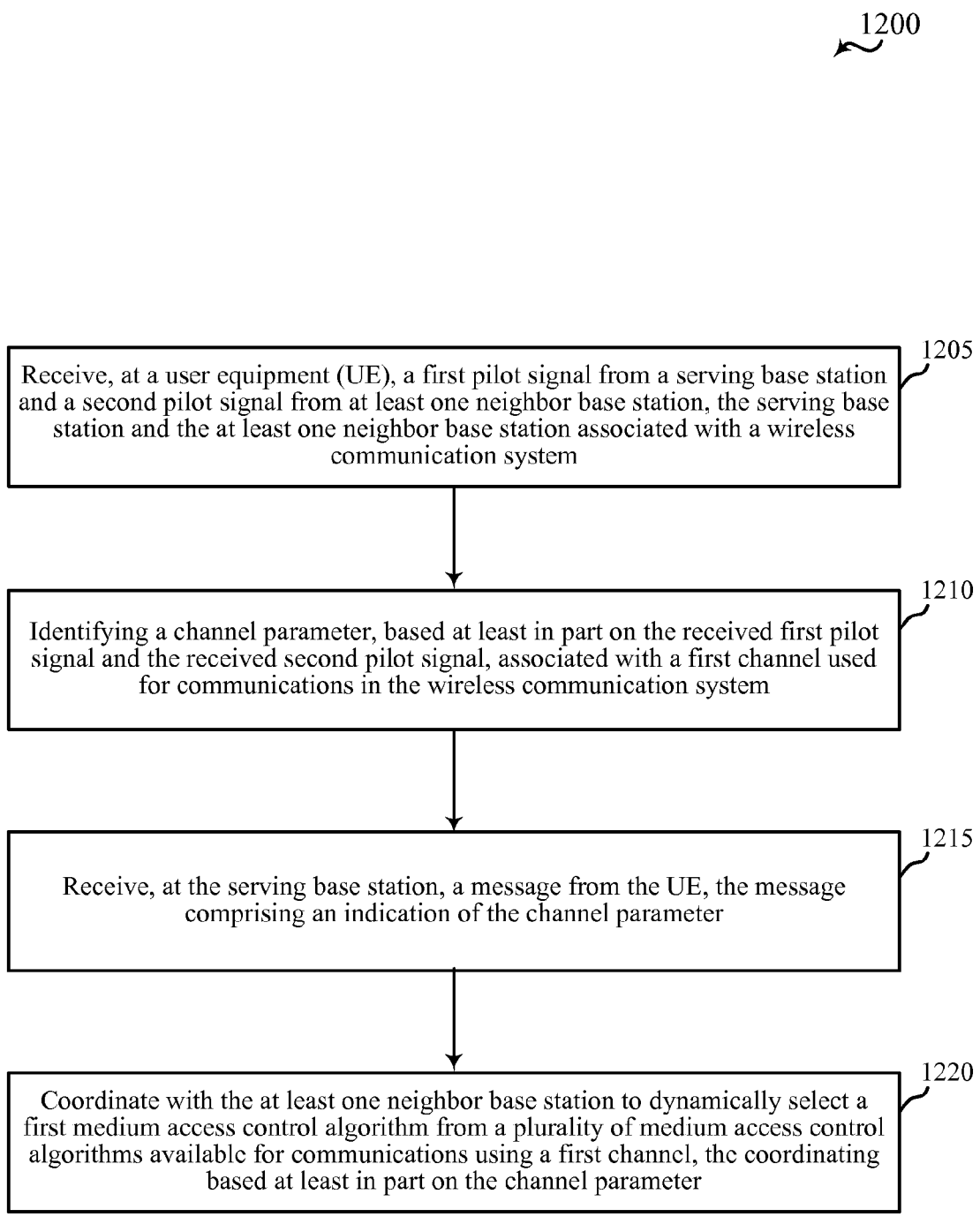
FIG. 12 is a flow chart illustrating an example of a method for wireless communication, in accordance with various aspects of the present disclosure.

FIG. 12 shows a flowchart illustrating a method 1200 for wireless communications, in accordance with various aspects of the present disclosure. The operations of method 1200 may be implemented by a base station 105 or its components, and/or by a device 505 as described with reference to FIGS. 1-6 and 8. For example, the operations of method 1200 may be performed by the MAC manager 515 as described with reference to FIGS. 5, 6, and 8. In some examples, a base station 105 may execute a set of codes to control the functional elements of the base station 105 to perform the functions described below. Additionally or alternatively, the base station 105 may perform aspects of the functions described below using special-purpose hardware. For convenience, the functions of the method 1200 will be described with reference to a serving base station, such as a base station 105.

At block 1205, the method 1200 may include a UE receiving a first pilot signal from a serving base station and from at least one neighbor base station. The serving base station and the at least one neighbor base station may be associated with a wireless communication system. In some examples, the wireless communication system may be a mmW wireless communication system.

At block 1210, the method 1200 may include the UE identifying a channel parameter associated with a first channel used for communications in a wireless communication system. The channel parameter may be identified based on the received first pilot signal and the received second pilot signal. The channel parameter may indicate an interference level associated with communications using the first channel, e.g., a frame error rate, a signal-to-interference ration, etc. In some examples, the first channel may be a directional or beamformed communications channel.

At block 1215, the method 1200 may include receiving, at the serving base station, a message from the UE conveying an indication of the channel parameter. The message may convey the channel parameter, information associated with the channel parameter, and/or information associated with a detected interference level.

At block 1220, the method 1200 may include the serving base station coordinating with the neighbor base station to dynamically select, based at least in part on the channel parameter indicated in the message from the UE, a first MAC algorithm from a plurality of MAC algorithms available for communications using the first channel. Examples of the multiple MAC algorithms available for communications using the first channel may include an un-coordinated MAC algorithm, a RTS/CTS MAC algorithm, and a coordinated MAC algorithm. Other MAC algorithms may also be utilized in accordance with aspects of the present disclosure. The coordination may include the serving base station receiving a traffic load indicator from the neighbor base station and selecting the first MAC algorithm based on the load indicator.

The operation(s) at blocks 1205, 1210, 1215, and/or 1220 may be performed using the MAC manager 515 described with reference to FIG. 5, 6, or 8.

Thus, the method 1200 may provide for wireless communication. It should be noted that the method 1200 is just one implementation and that the operations of the method 1200 may be rearranged or otherwise modified such that other implementations are possible.

In some examples, aspects from two or more of the methods 900-1200 may be combined. It should be noted that the methods 900, 1000, etc. are just example implementations, and that the operations of the methods 900-1200 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   accessing a first channel for communications in a wireless communication system based at least in part on a first medium access control algorithm from a plurality of medium access control algorithms available for communications using the first channel;
   identifying a channel parameter associated with the first channel;
   dynamically selecting, based at least in part on the channel parameter, a second medium access control algorithm to access the first channel from the plurality of medium access control algorithms; and
   switching to the second medium access control algorithm to access the first channel based at least in part on the dynamically selected second medium access control algorithm.

2. The method of claim 1, further comprising:
   dynamically selecting a third medium access control algorithm from the plurality of medium access control algorithms for communications using a second channel of the wireless communication system.

3. The method of claim 2, wherein the wireless communication system is a millimeter-wave wireless communication system and the first channel is associated with a first beam direction and the second channel is associated with a second beam direction, the second beam direction being different from the first beam direction.

4. The method of claim 1, wherein identifying the channel parameter comprises:
receiving, at a user equipment (UE), a first pilot signal from a serving base station and a second pilot signal from at least one neighbor base station, the service base station and the at least one neighbor base station associated with the wireless communication system; and
identifying the channel parameter based at least in part on the received first pilot signal and the received second pilot signal.

5. The method of claim 4, wherein the received first pilot signal and the received second pilot signal comprise a load indicator, wherein the channel parameter is determined based at least in part on the load indicator.

6. The method of claim 4, further comprising:
determining that the second pilot signal from the at least one neighbor base station interferes with the first pilot signal from the serving base station, wherein the channel parameter is based at least in part on the interference.

7. The method of claim 4, further comprising:
receiving, at the serving base station, a message from the UE, the message comprising an indication of the channel parameter, wherein dynamically selecting, by the serving base station, the second medium access control algorithm is based at least in part on the channel parameter indicated in the message; and
informing the at least one neighbor base station of the selected second medium access control algorithm to be used for communications using the wireless communication system.

8. The method of claim 4, further comprising:
receiving, at the serving base station, a message from the UE, the message comprising an indication of the channel parameter; and
coordinating with the at least one neighbor base station to dynamically select the second medium access control algorithm based at least in part on the channel parameter.

9. The method of claim 8, wherein coordinating with the at least one neighbor base station comprises:
receiving, at the serving base station, a message from the at least one neighbor base station conveying a load indicator, wherein dynamically selecting, by the serving base station, the second medium access control algorithm is based at least in part on the channel parameter and the load indicator; and
informing the at least one neighbor base station of the selected second medium access control algorithm to be used for communications using the wireless communication system.

10. The method of claim 4, further comprising:
determining, by the UE, that the channel parameter has exceeded a predefined threshold level,
wherein dynamically selecting, by the UE, the second medium access control algorithm is based at least in part on the channel parameter exceeding the predefined threshold level; and
sending a message to the serving base station conveying an indication of the selected second medium access control algorithm.

11. The method of claim 4, wherein the first pilot signal from the serving base station and the second pilot signal from the at least one neighbor base station are directional pilot signals.

12. The method of claim 11, further comprising:
identifying a first identification parameter associated with the first directional pilot signal from the serving base station and a second identification parameter associated with the second directional pilot signal from the at least one neighbor base station,
wherein the channel parameter is associated with the identification parameters.

13. The method of claim 1, wherein the plurality of available medium access control algorithms comprise an un-coordinated medium access control algorithm, a request-to-send/clear-to-send (RTS/CTS) medium access control algorithm, and a coordinated medium access control algorithm.

14. An apparatus for wireless communication, comprising:
a processor;
memory in electronic communication with the processor; and
instructions stored in the memory, the instructions being executable by the processor to:
access a first channel for communications in a wireless communication system based at least in part on a first medium access control algorithm from a plurality of medium access control algorithms available for communications using the first channel;
identify a channel parameter associated with the first channel;
dynamically select, based at least in part on the channel parameter, a second medium access control algorithm to access the first channel from the plurality of medium access control algorithms; and
switch to the second medium access control algorithm to access the first channel based at least in part on the dynamically selected second medium access control algorithm.

15. The apparatus of claim 14, further comprising instructions executable by the processor to:
dynamically select a third medium access control algorithm from the plurality of medium access control algorithms for communications using a second channel of the wireless communication system.

16. The apparatus of claim 15, wherein the wireless communication system is a millimeter-wave wireless communication system and the first channel is associated with a first beam direction and the second channel is associated with a second beam direction, the second beam direction being different from the first beam direction.

17. The apparatus of claim 14, wherein the instructions to identify the channel parameter are further executable by the processor to:
receive, at a user equipment (UE), a first pilot signal from a serving base station and a second pilot signal from at least one neighbor base station, the service base station and the at least one neighbor base station associated with the wireless communication system; and
identify the channel parameter based at least in part on the received first pilot signal and the received second pilot signal.

18. The apparatus of claim 17, wherein the received first pilot signal and the received second pilot signal comprise a load indicator, wherein the channel parameter is determined based at least in part on the load indicator.

19. The apparatus of claim 17, further comprising instructions executable by the processor to:
determine that the second pilot signal from the at least one neighbor base station interferes with the first pilot signal from the serving base station, wherein the channel parameter is based at least in part on the interference.

20. The apparatus of claim 17, further comprising instructions executable by the processor to:
receive, at the serving base station, a message from the UE, the message comprising an indication of the channel parameter, wherein dynamically selecting, by the serving base station, the second medium access control algorithm is based at least in part on the channel parameter indicated in the message; and
inform the at least one neighbor base station of the selected second medium access control algorithm to be used for communications using the wireless communication system.

21. The apparatus of claim 17, further comprising instructions executable by the processor to:
receive, at the serving base station, a message from the UE, the message comprising an indication of the channel parameter; and
coordinate with the at least one neighbor base station to dynamically select the second medium access control algorithm based at least in part on the channel parameter.

22. The apparatus of claim 21, wherein the instructions to coordinate with the at least one neighbor base station are further executable by the processor to:
receive, at the serving base station, a message from the at least one neighbor base station conveying a load indicator, wherein dynamically selecting, by the serving base station, the second medium access control algorithm is based at least in part on the channel parameter and the load indicator; and
inform the at least one neighbor base station of the selected second medium access control algorithm to be used for communications using the wireless communication system.

23. The apparatus of claim 17, further comprising instructions executable by the processor to:
determine, by the UE, that the channel parameter has exceeded a predefined threshold level, wherein dynamically selecting, by the UE, the second medium access control algorithm is based at least in part on the channel parameter exceeding the predefined threshold level; and
send a message to the serving base station conveying an indication of the selected second medium access control algorithm.

24. The apparatus of claim 17, wherein the first pilot signal from the serving base station and the second pilot signal from the at least one neighbor base station are directional pilot signals.

25. The apparatus of claim 24, further comprising instructions executable by the processor to:
identify a first identification parameter associated with the first directional pilot signal from the serving base station and a second identification parameter associated with the second directional pilot signal from the at least one neighbor base station,
wherein the channel parameter is associated with the identification parameters.

26. The apparatus of claim 14, wherein the plurality of available medium access control algorithms comprise an un-coordinated medium access control algorithm, a request-to-send/clear-to-send (RTS/CTS) medium access control algorithm, and a coordinated medium access control algorithm.

27. An apparatus for wireless communication, comprising:
means for accessing a first channel for communications in a wireless communication system based at least in part on a first medium access control algorithm from a plurality of medium access control algorithms available for communications using the first channel;
means for identifying a channel parameter associated with the first channel;
means for dynamically selecting, based at least in part on the channel parameter, a second medium access control algorithm to access the first channel from the plurality of medium access control algorithms; and
means for switching to the second medium access control algorithm to access the first channel based at least in part on the dynamically selected second medium access control algorithm.

28. The apparatus of claim 27, further comprising:
means for dynamically selecting a third medium access control algorithm from the plurality of medium access control algorithms for communications using a second channel of the wireless communication system.

29. The apparatus of claim 28, wherein the wireless communication system is a millimeter-wave wireless communication system and the first channel is associated with a first beam direction and the second channel is associated with a second beam direction, the second beam direction being different from the first beam direction.

30. A non-transitory computer-readable medium storing computer-executable code for wireless communication, the code executable by a processor to:
access a first channel for communications in a wireless communication system based at least in part on a first medium access control algorithm from a plurality of medium access control algorithms available for communications using the first channel;
identify a channel parameter associated with the first channel;
dynamically select, based at least in part on the channel parameter, a second medium access control algorithm to access the first channel from the plurality of medium access control algorithms; and
switch to the second medium access control algorithm to access the first channel based at least in part on the dynamically selected second medium access control algorithm.

* * * * *